(12) United States Patent
Wiercigroch et al.

(10) Patent No.: US 10,605,067 B2
(45) Date of Patent: Mar. 31, 2020

(54) CONTROL METHOD

(71) Applicant: ITI Scotland Limited, Glasgow (GB)

(72) Inventors: Marian Wiercigroch, Aberdeen (GB); Yang Liu, Glasgow (GB)

(73) Assignee: ITI Scotland Limited, Glasgow (GB)

(*) Notice: Subject to any disclaimer, the term of this patent is extended or adjusted under 35 U.S.C. 154(b) by 196 days.

(21) Appl. No.: 15/028,014

(22) PCT Filed: Oct. 9, 2014

(86) PCT No.: PCT/EP2014/071700
§ 371 (c)(1),
(2) Date: Apr. 7, 2016

(87) PCT Pub. No.: WO2015/052300
PCT Pub. Date: Apr. 16, 2015

(65) Prior Publication Data
US 2016/0245064 A1    Aug. 25, 2016

(30) Foreign Application Priority Data

Oct. 9, 2013  (GB) .................................. 1317883.5

(51) Int. Cl.
*E21B 44/00*        (2006.01)
*E21B 44/02*        (2006.01)
(Continued)

(52) U.S. Cl.
CPC .......... *E21B 44/02* (2013.01); *E21B 41/0092* (2013.01); *E21B 44/005* (2013.01);
(Continued)

(58) Field of Classification Search
CPC ... E21B 44/00; E21B 7/24; E21B 6/00; E21B 2041/0028; E21B 4/06; E21B 4/14
See application file for complete search history.

(56) References Cited

U.S. PATENT DOCUMENTS 6,367,565 B1 * 4/2002 Hall
8,353,368 B2   1/2013 Wiercigroch
(Continued)

FOREIGN PATENT DOCUMENTS

GB    2364081 A    1/2002
GB    2485685 A    5/2012
(Continued)

OTHER PUBLICATIONS

Linder, Nora, International Preliminary Report on Patentability and Written Opinion, PCT/EP2014/071700, The International Bureau of WIPO, dated Apr. 26, 2016.
(Continued)

*Primary Examiner* — Kipp C Wallace
(74) *Attorney, Agent, or Firm* — Gavrilovich, Dodd & Lindsey LLP

(57) ABSTRACT

Provided is a method for controlling a resonance enhanced rotary drill comprising a drilling module and a control system for controlling one or more drilling parameters of the drilling module, which method comprises:
(a) employing one or more initial characteristics of the material being drilled, and/or one or more initial drilling parameters to control the drilling module;
(b) measuring one or more current drilling parameters to obtain one or more measured drilling parameters;
(c) employing the one or more measured drilling parameters as an input in the control system, in order to obtain an output from the control system, which output comprises one or more calculated characteristics of the material being drilled;
(d) employing the one or more calculated characteristics of the material being drilled, and/or the one or more measured drilling parameters, as an input in the control system, in order to obtain an output from the control system, which output comprises one or more calculated drilling parameters;

(Continued)

(e) optionally applying the one or more calculated drilling parameters to the drilling module;
(f) optionally repeating steps (b), (c) (d) and (e).

20 Claims, 35 Drawing Sheets

(51) Int. Cl.
  *G06K 9/66* (2006.01)
  *E21B 41/00* (2006.01)
  *G05B 13/02* (2006.01)
  *E21B 6/00* (2006.01)
  *E21B 49/00* (2006.01)

(52) U.S. Cl.
  CPC ........... *G05B 13/0285* (2013.01); *G06K 9/66* (2013.01); *E21B 6/00* (2013.01); *E21B 49/003* (2013.01); *E21B 2041/0028* (2013.01); *G05B 13/027* (2013.01)

(56) References Cited

U.S. PATENT DOCUMENTS

| | | |
|---|---|---|
| 2002/0050168 A1* | 5/2002 | Bongers-Ambrosius |
| 2004/0007387 A1* | 1/2004 | Bar-Cohen ................ E21B 7/24 175/50 |
| 2007/0240904 A1 | 10/2007 | Stauffer et al. |
| 2009/0055135 A1 | 2/2009 | Tang et al. |
| 2009/0114445 A1 | 5/2009 | Dashevskiy |
| 2010/0319994 A1* | 12/2010 | Wiercigroch ............. E21B 7/24 |
| 2011/0056750 A1 | 3/2011 | Lucon |
| 2012/0130693 A1 | 5/2012 | Ertas et al. |
| 2012/0217067 A1 | 8/2012 | Mebane, III et al. |
| 2012/0234600 A1 | 9/2012 | Lee et al. |
| 2012/0241219 A1 | 9/2012 | Wiercigroch |
| 2014/0083772 A1 | 3/2014 | Wiercigroch |
| 2014/0116777 A1 | 5/2014 | Wiercigroch |

FOREIGN PATENT DOCUMENTS

| | | |
|---|---|---|
| GB | 2489227 A | 9/2012 |
| WO | 2007/141550 A1 | 12/2007 |
| WO | 2011/017626 A1 | 2/2011 |
| WO | 2012/076401 A1 | 6/2012 |
| WO | 2015/052301 A2 | 4/2015 |

OTHER PUBLICATIONS

Versluis, Anton, Written Opinion of the International Searching Authority, PCT/EP2014/071700, European Patent Office, dated Oct. 29, 2015.

Harnees, D., Patent Act 1977: Search Report under Section 17(5), Appl No. GB1317883.5, UK Intellectual Property Office, dated Mar. 28, 2014.

Brassart, P., Written Opinion of the International Searching Authority, PCT/EP2014/071701, European Patent Office, dated Jun. 22, 2015.

Harness, D., Patent Act 1977: Search Report under Section 17(5), Appl No. GB1318020.3, UK Intellectual Property Office, dated Mar. 28, 2014.

Linder, Nora, international Preliminary Report on Patentability and Written Opinion, PCT/EP2014/071701, The International Bureau of WIPO, dated Apr. 21, 2016.

Larousse dictionary of science and technology. Edited by P. M. B. Walker, Larousse, Edinburgh, 1995, pp. 226, 356, 511, 838 and 1049.

* cited by examiner

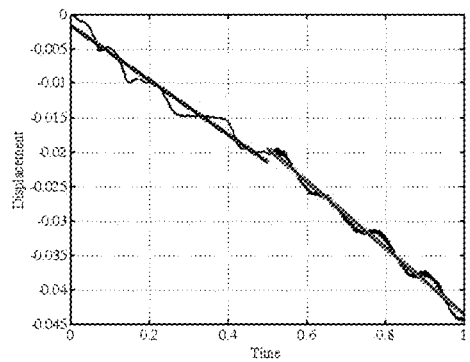
(a)
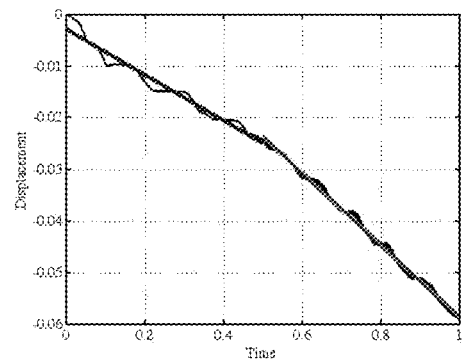
(b)
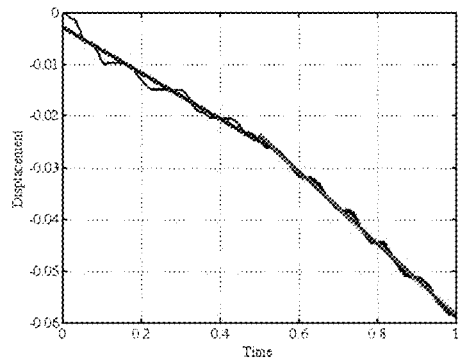
(c)
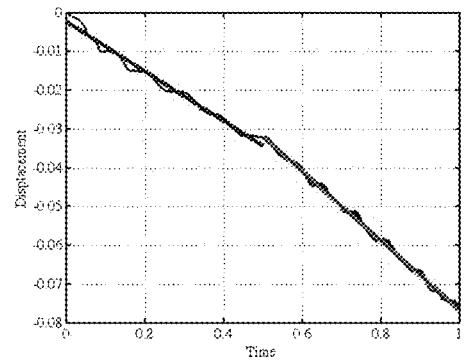
(d)
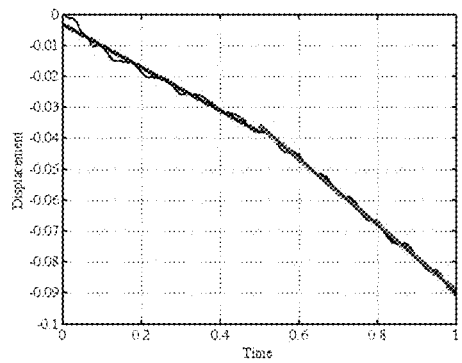
(e)
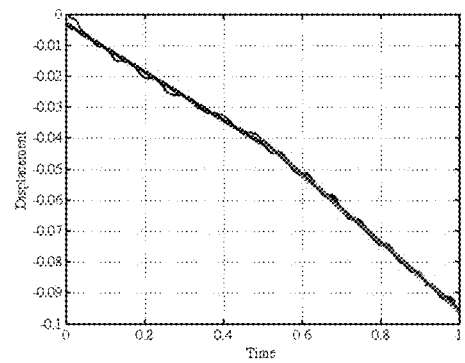
(f)
FIGURE 28A-F

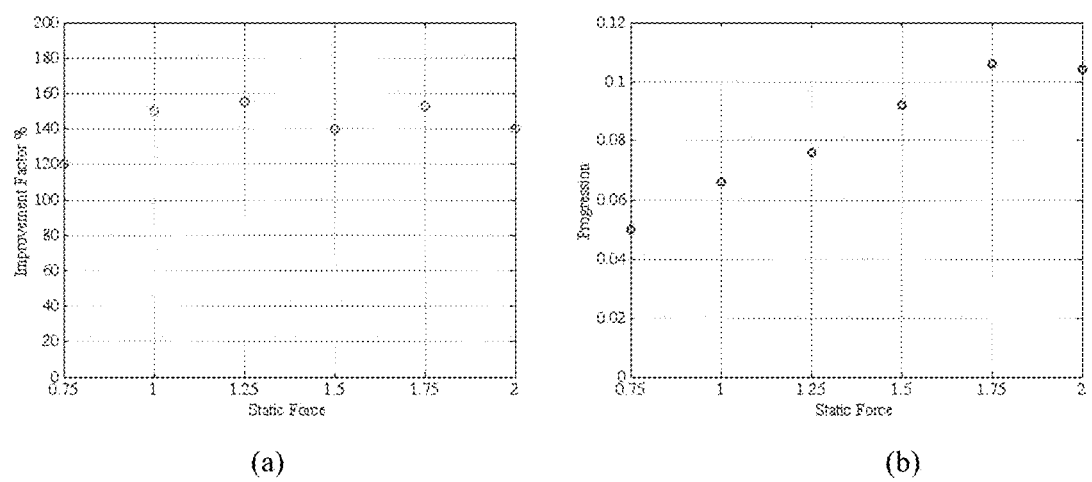
FIGURE 29A-B

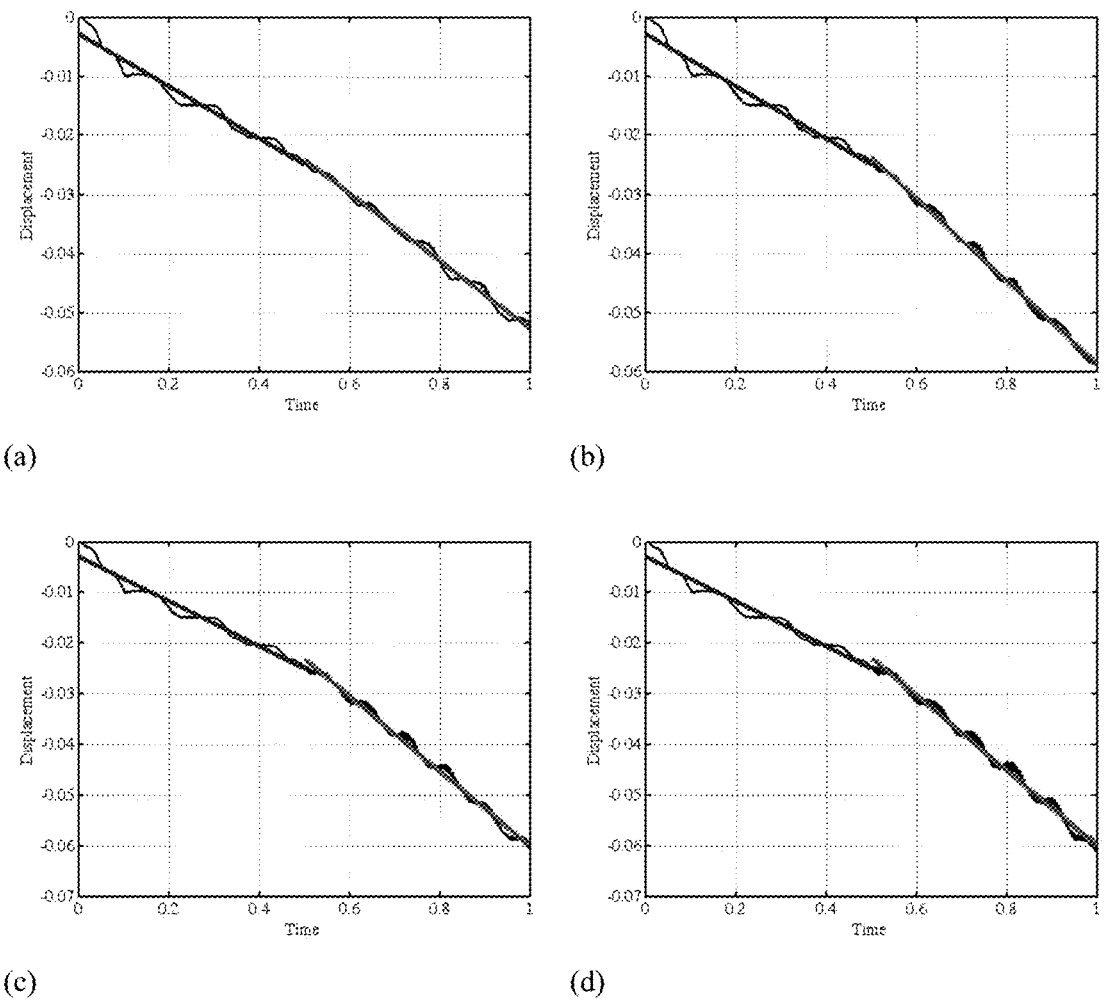
FIGURE 30A-D

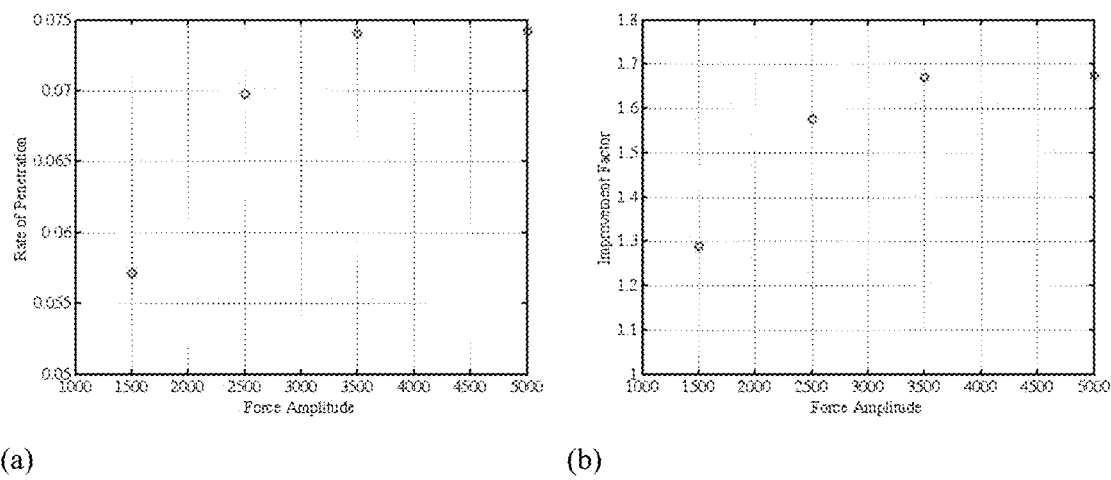
FIGURE 31A-B

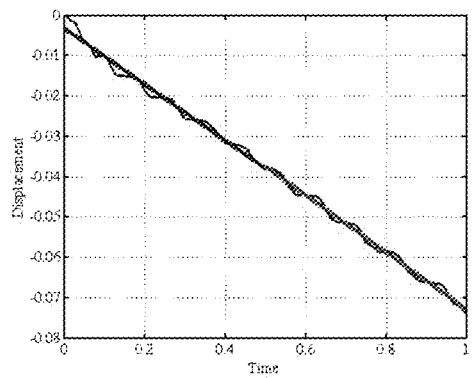
(a)
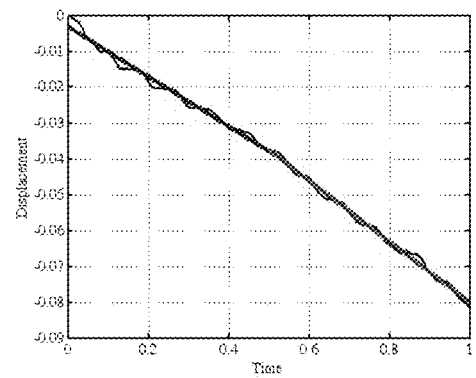
(b)
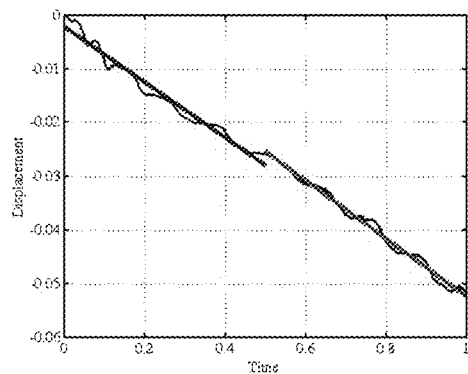
(c)
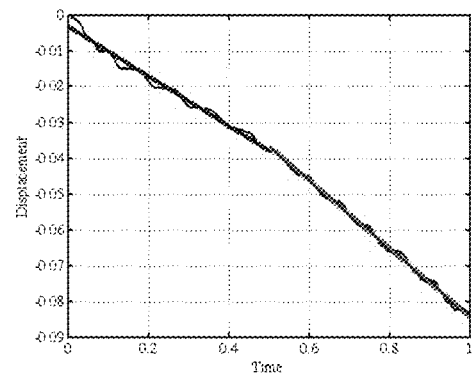
(d)
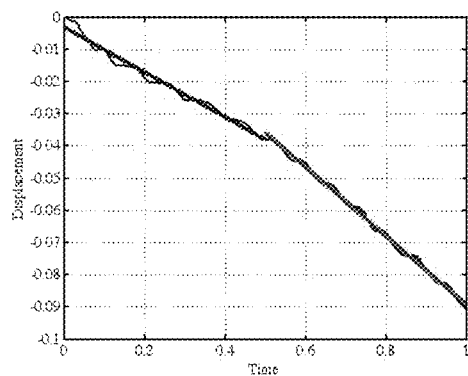
(e)
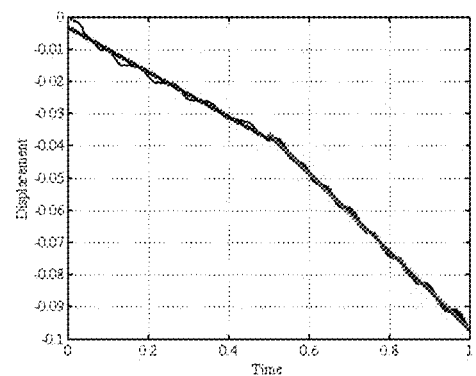
(f)
FIGURE 32A-F

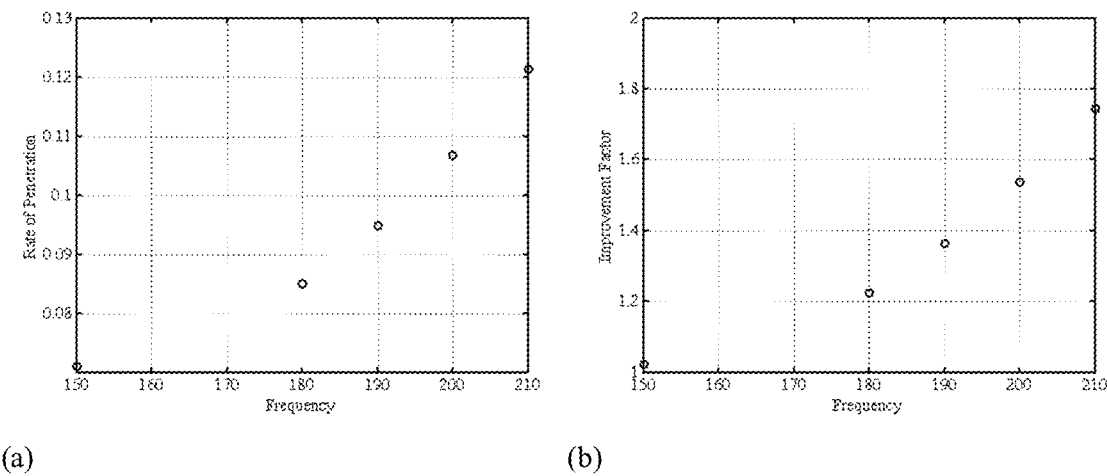
FIGURE 33A-B

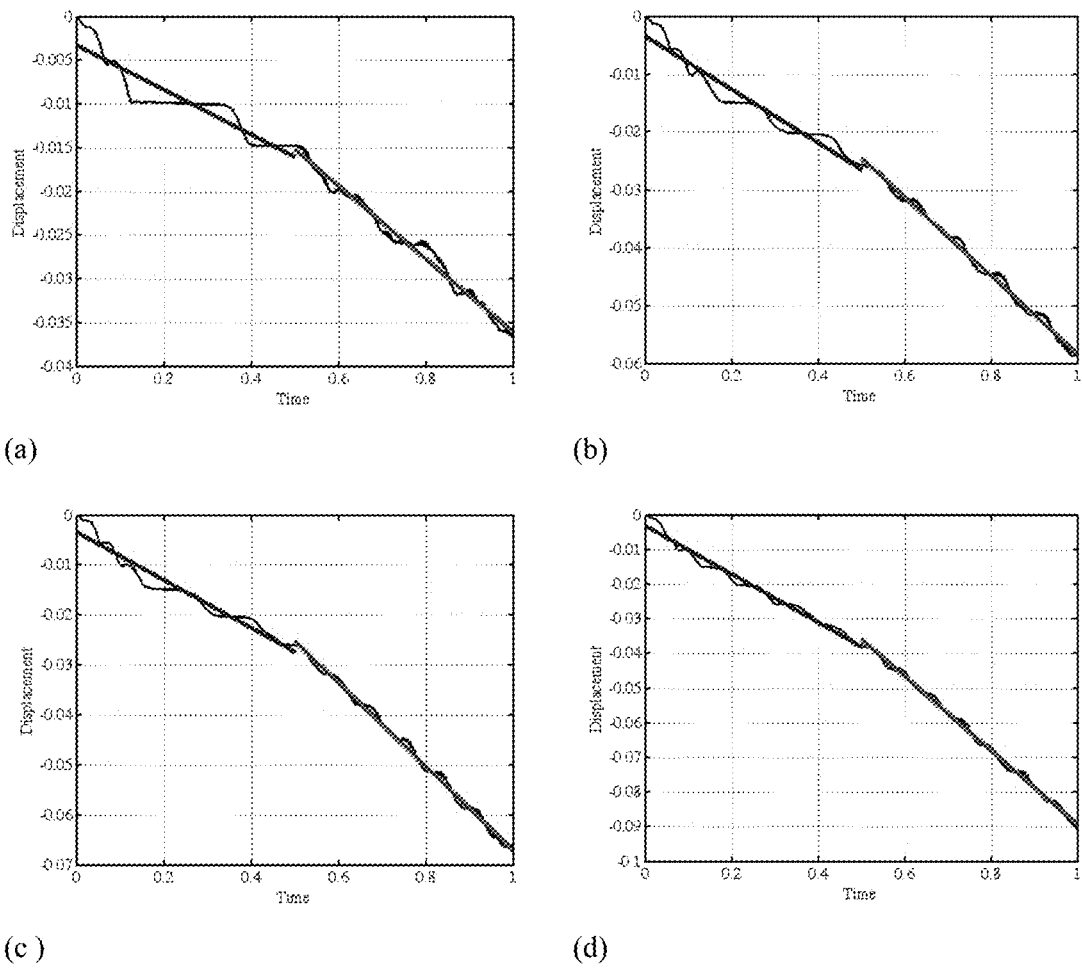
FIGURE 34A-D

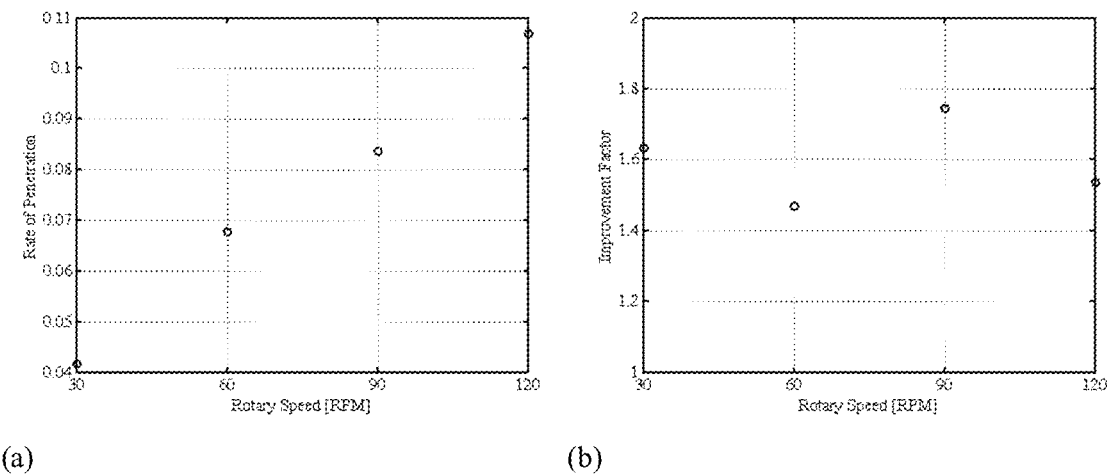
FIGURE 35A-B

CONTROL METHOD

CROSS REFERENCE TO RELATED APPLICATIONS

This application is a U.S. National Stage Application filed under 35 U.S.C. § 371 and claims priority to International Application No. PCT/EP2014/071700, filed Oct. 9, 2014, which application claims priority to Great Britain Application No. 1317883.5, filed Oct. 9, 2013, the disclosures of which are incorporated herein by reference.

The present invention relates to percussion enhanced rotary drilling and in particular to resonance enhanced drilling (RED). Embodiments of the invention are directed to methods and apparatus for controlling resonance enhanced rotary drilling to improve drilling performance, in particular methods and apparatus that make use of fuzzy logic control. Further embodiments described herein are directed to resonance enhanced rotary drilling equipment which may be controllable according to these methods and apparatus. Certain embodiments of the invention are applicable to any size of drill or material to be drilled. Certain more specific embodiments are directed at drilling through rock formations, particularly those of variable composition, which may be encountered in deep-hole drilling applications in the oil, gas and mining industries.

Percussion rotary drilling is known per se. A percussion rotary drill possesses a mechanism inducing an axial loading to the rotary drill bit. The mechanism provides impact forces on the material being drilled so as to break up the material which aids the rotary drill bit in cutting though the material.

Resonance enhanced rotary drilling is a special type of percussion rotary drilling in which there is an oscillator vibrating at high frequency so as to achieve resonance with the material being drilled. This results in an effective use of the mechanical energy at the rotary drill bit thus increasing drilling efficiency when compared to standard percussion rotary drilling.

U.S. Pat. No. 3,990,522 discloses a percussion rotary drill which uses a hydraulic hammer mounted in a rotary drill for drilling bolt holes. It is disclosed that an impacting cycle of variable stroke and frequency can be applied and adjusted to the natural frequency of the material being drilled to produce an amplification of the pressure exerted at the tip of the drill bit. A servo-valve maintains percussion control, and in turn, is controlled by an operator through an electronic control module connected to the servo-valve by an electric conductor. The operator can selectively vary the percussion frequency from 0 to 2500 cycles per minute (i.e. 0 to 42 Hz) and selectively vary the stroke of the drill bit from 0 to ⅛ inch (i.e. 0 to 3.175 mm) by controlling the flow of pressurized fluid to and from an actuator. It is described that by selecting a percussion stroke having a frequency that is equal to the natural or resonant frequency of the rock strata being drilled, the energy stored in the rock strata by the percussion forces will result in amplification of the pressure exerted at the tip of the drill bit such that the solid material will collapse and dislodge and permit drill rates in the range 3 to 4 feet per minute.

There are several problems which have been identified with the aforementioned arrangement and which are discussed below.

High frequencies are not attainable using the apparatus of U.S. Pat. No. 3,990,522 which uses a relatively low frequency hydraulic periodic impactor, (described as an oscillator, but which does not oscillate in the strictly technical sense). Accordingly, although U.S. Pat. No. 3,990,522 discusses the possibility of resonance, it would appear that the low frequencies attainable by its impactor are insufficient to achieve resonance enhanced drilling through many hard materials.

Regardless of the frequency issue discussed above, resonance cannot easily be achieved and maintained in any case using the arrangement of U.S. Pat. No. 3,990,522, particularly if the drill passes through different materials having different resonance characteristics. This is because control of the percussive frequency and stroke in the arrangement of U.S. Pat. No. 3,990,522 is achieved manually by an operator. As such, it is difficult to control the apparatus to continuously adjust the frequency and stroke of percussion forces to maintain resonance as the drill passes through materials of differing type. This may not be such a major problem for drilling shallow bolt holes as described in U.S. Pat. No. 3,990,522. An operator can merely select a suitable frequency and stroke for the material in which a bolt hole is to be drilled and then operate the drill. However, the problem is exacerbated for deep-drilling through many different layers of rock. An operator located above a deep-drilled hole cannot see what type of rock is being drilled through and cannot readily achieve and maintain resonance as the drill passes from one rock type to another, particularly in regions where the rock type changes frequently.

Some of the aforementioned problems have been solved by the present inventor as described in WO 2007/141550. This patent application describes a resonance enhanced rotary drill comprising an automated feedback and control mechanism which can continuously adjust the frequency and stroke of percussion forces to maintain resonance as a drill passes through rocks of differing type. The drill is provided with an adjustment means which is responsive to conditions of the material through which the drill is passing and a control means in a down-hole location which includes sensors for taking down-hole measurements of material characteristics whereby the apparatus is operable down-hole under closed loop real-time control.

US2006/0157280 suggests down-hole closed loop real-time control of an oscillator. It is described that sensors and a control unit can initially sweep a range of frequencies while monitoring a key drilling efficiency parameter such as rate of progression (ROP). An oscillation device can then be controlled to provide oscillations at an optimum frequency until the next frequency sweep is conducted. The pattern of the frequency sweep can be based on a one or more elements of the drilling operation such as a change in formation, a change in measured ROP, a predetermined time period or instruction from the surface. The detailed embodiment utilises an oscillation device which applies torsional oscillation to the rotary drill-bit and torsional resonance is referred to. However, it is further described that exemplary directions of oscillation applied to the drill-bit include oscillations across all degrees-of-freedom and are not utilised in order to initiate cracks in the material to be drilled. Rather, it is described that rotation of the drill-bit causes initial fractioning of the material to be drilled and then a momentary oscillation is applied in order to ensure that the rotary drill-bit remains in contact with the fracturing material. There does not appear to be any disclosure or suggestion of providing an oscillator which can import sufficiently high axial oscillatory loading to the drill-bit in order to initiate cracks in the material through which the rotary drill-bit is passing as is required in accordance with resonance enhanced drilling as described in WO 2007/141550.

None of the prior art provides any detail about how to monitor axial oscillations. Sensors are disclosed generally in the US2006/0157280 and in WO 2007/141550 but the positions of these sensors relative to components such as a vibration isolation unit and a vibration transmission unit is not discussed.

Published international application WO2011/032874 by the present inventor looks to provide further improvements to the methods and apparatus described in the prior art. This application discloses a method for the controlling the frequency of the oscillator in the resonance enhanced rotary drill within a range defined by $U_s$ (the compressive strength of material being drilled). The method further involves controlling dynamic force (Fd) of the oscillator within a range defined by $U_s$. The $U_s$ is measured using a sensor.

The solutions described in WO 2007/141550, US2006/0157280 and WO2011/032874 focus particularly on the nature of the oscillations of the resonator. These are only a subset of the degrees of freedom involved, and the methods do not take into account other important aspects of RED. In addition, the estimation of material characteristics is too simple, relying on imprecise measurement of compressive strength using sensors, and not accounting for other material characteristics at all. Consequently, there is a desire to make further improvements to the methods and apparatus described therein. It is an aim of embodiments of the present invention to make such improvements in order to increase drilling efficiency while limiting wear and tear on the apparatus so as to increase the lifetime of the apparatus. It is a further aim to more precisely control resonance enhanced drilling, particularly when drilling through rapidly changing rock types.

Accordingly, the present invention provides a method for controlling a resonance enhanced rotary drill comprising a drilling module and a control system for controlling one or more drilling parameters of the drilling module, which method comprises:
  (a) employing one or more initial characteristics of the material being drilled, and/or one or more initial drilling parameters to control the drilling module;
  (b) measuring one or more current drilling parameters to obtain one or more measured drilling parameters;
  (c) employing the one or more measured drilling parameters as an input in the control system, in order to obtain an output from the control system, which output comprises one or more calculated characteristics of the material being drilled;
  (d) employing the one or more calculated characteristics of the material being drilled, and/or the one or more measured drilling parameters, as an input in the control system, in order to obtain an output from the control system, which output comprises one or more calculated drilling parameters;
  (e) optionally applying the one or more calculated drilling parameters to the drilling module;
  (f) optionally repeating steps (b), (c) (d) and (e).

In the present context, the resonance enhanced rotary drill is not especially limited and may be any resonance enhanced rotary drill known in the art, provided that it comprises a drilling module and a control system. The drilling module is not especially limited and may be any drilling module known in the art for resonance enhanced drilling, such as a drilling module as disclosed in published patent application WO2012/076401. The control system is not especially limited provided that it is capable of performing the method of the invention. In order to achieve this, the control system should be capable of calculating one or more characteristics of the material to be drilled, and one or more drilling parameters. The methods for doing this are not especially limited, although certain specific methods do provide significant advantages, and will be discussed in detail below. The control system may comprise one or more controllers. Thus, in some embodiments, a single controller may be employed to calculate all the parameters. However, in other embodiments there may be two or more controllers. In some embodiments, for example the control system may comprise a controller for calculating the characteristics of the material being drilled, and a further controller for calculating the drilling parameters. Together the one or more or two or more controllers comprise the control system.

The inventor have discovered a process capable of using the drilling parameters to accurately and precisely calculate specific characteristics of the material being drilled, and then using these characteristics in conjunction with measured drilling parameters (real-time drilling parameters) to calculate updated drilling parameters that can be applied to the drilling module. One or more real-time drilling parameters (rate of progression, weight on bit etc.) are measured in each cyclic iteration of the control process (the real-time drilling parameters change as the material being drilled changes, so measurement to keep track of the actual drilling parameters is required), and if necessary, for example because the rock type becomes harder or softer, the new calculated drilling parameters will be applied to the drill. Typically step (e) of applying the one or more calculated drilling parameters to the drilling module is carried out if one or more of the calculated drilling parameters are different (or sufficiently different within chosen limits) from the equivalent one or more of the measured drilling parameters.

Repeating the control cycle using the updated drilling parameters will cause the drilling to be more efficient. Thus any drilling parameter desired can be maximised (or minimised or optimised), although usually the rate of progression (ROP) or 'speed of drilling' and/or weight on bit (WOB) are the most desirable parameters to optimise.

Previously, control methods were not particularly effective in resonance enhanced drilling (RED) processes, due to the more complicated nature of RED as compared with regular drilling: the oscillation of the drill introduces extra degrees of freedom into the system, such as the frequency and amplitude of oscillation and the dynamic force associated with the oscillation, making any prediction or calculation much more complex. Known methods have attempted to take the oscillation into account, but still require improvement. Using the present method, the inventor has been able to take many more parameters into account, and also to take into account the nature of the material being drilled much more effectively. Accordingly, the inventor has solved many existing problems, and resonance enhanced drilling has been made quicker and cheaper than in known systems, and wear on materials has been reduced.

The invention will be described by way of example only with reference to the following Figures.

FIG. 1 shows a drilling module according to an embodiment of the present invention;

FIGS. 2(a) and (b) show graphs illustrating frequency as a function of vibration amplitude for various vibrational masses and various compressive strengths of material to be drilled;

FIG. 3 shows a graph illustrating frequency as a function of vibration amplitude for various vibrational masses given a fixed power supply; and FIG. 4 shows a schematic representation of a control system of the present invention. In this scheme, the controller for calculating the characteristics of the material being drilled is labelled 'Rock Identification Mechanism', the controller for calculating the drilling parameters is labelled 'Controller', and various exemplary material characteristics and drilling parameters are shown as being employed in the control method.

Figure 8:
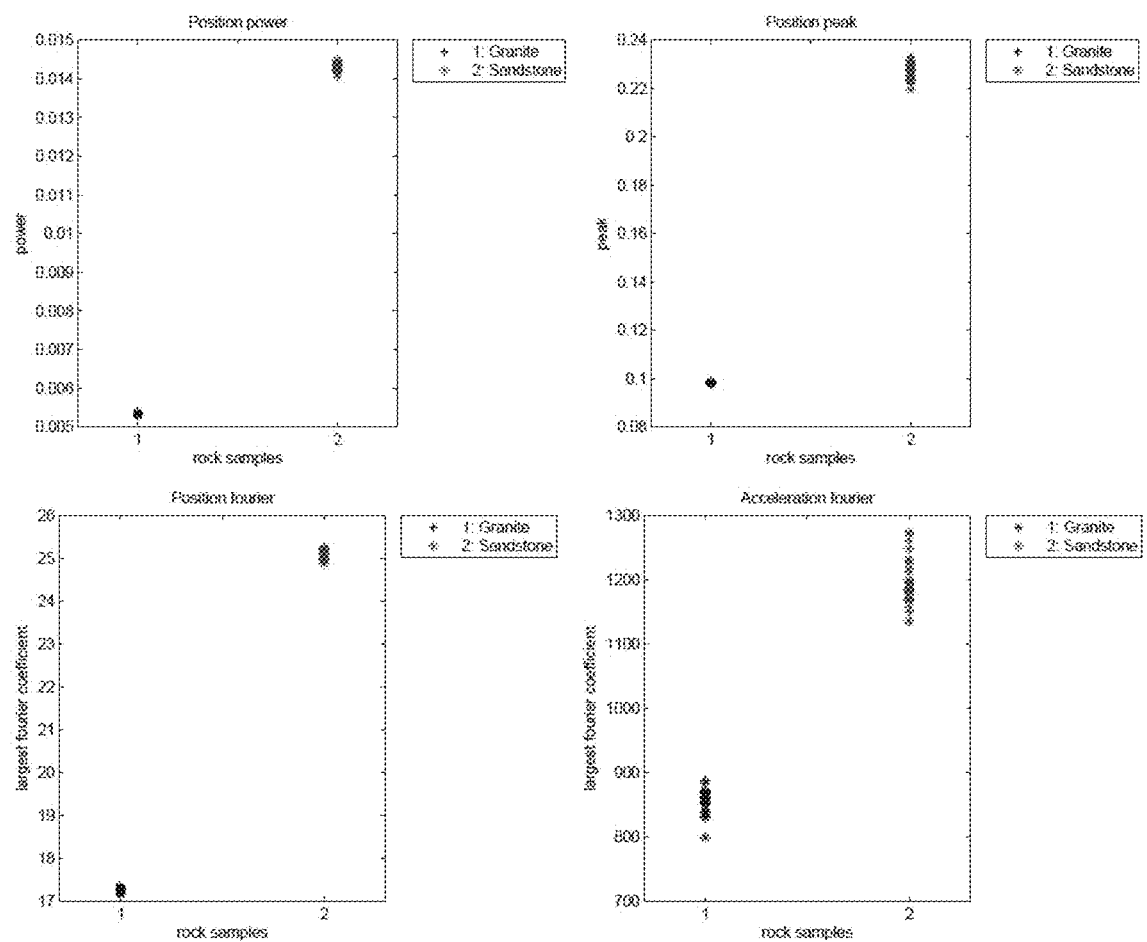

FIG. 8 various measurements taken for the ANN training (position and acceleration signals) are shown.

Figure 9:
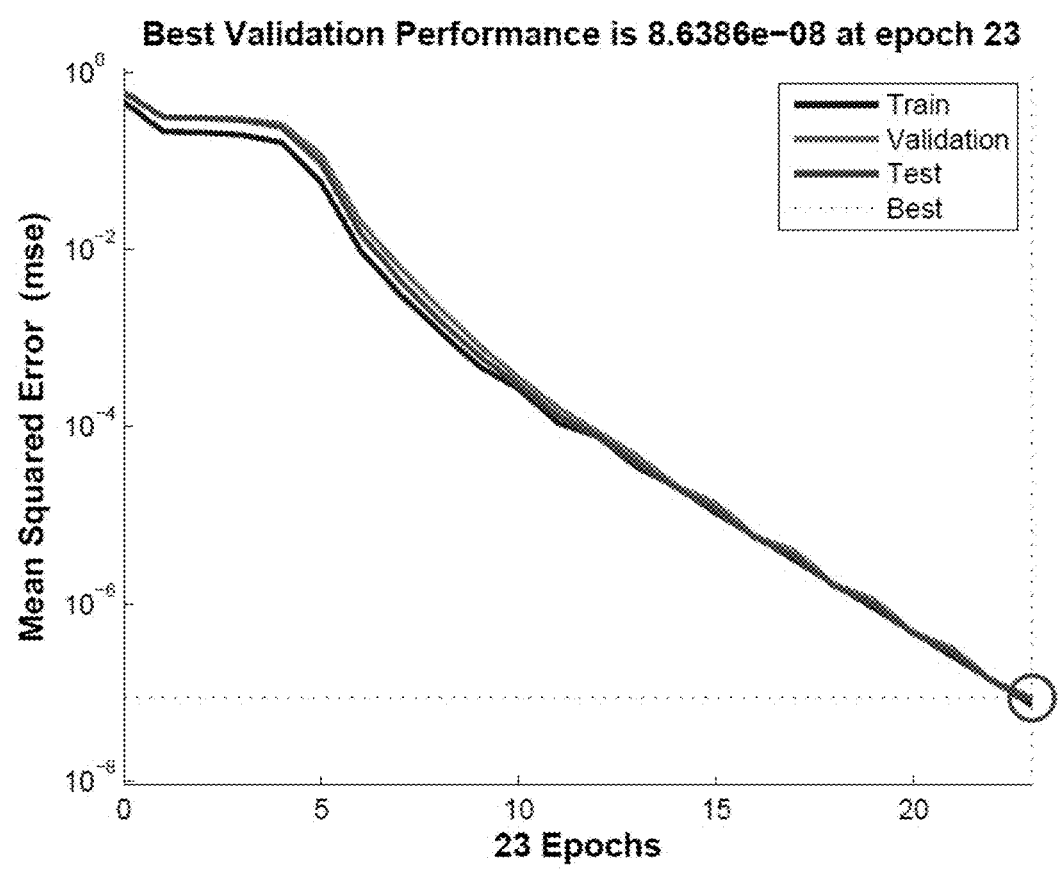

FIG. 9 shows the performance of the ANN training process.

Figure 10:
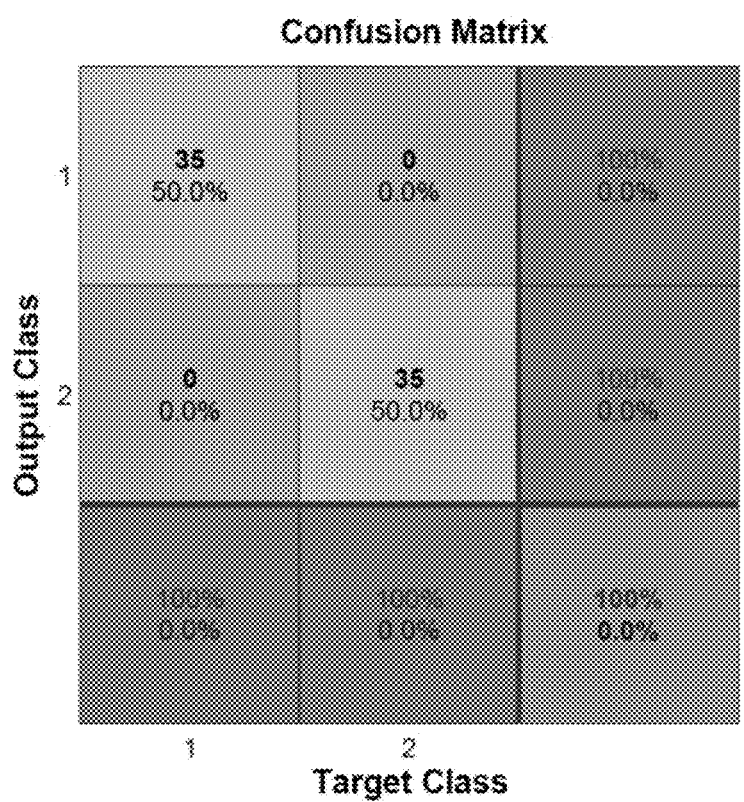

FIG. 10 shows an identification matrix.

Figure 11:
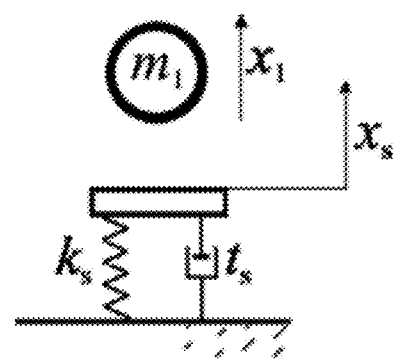

FIG. 11 shows a soft impact model as massless fender supported by damper and spring.

Figure 12:
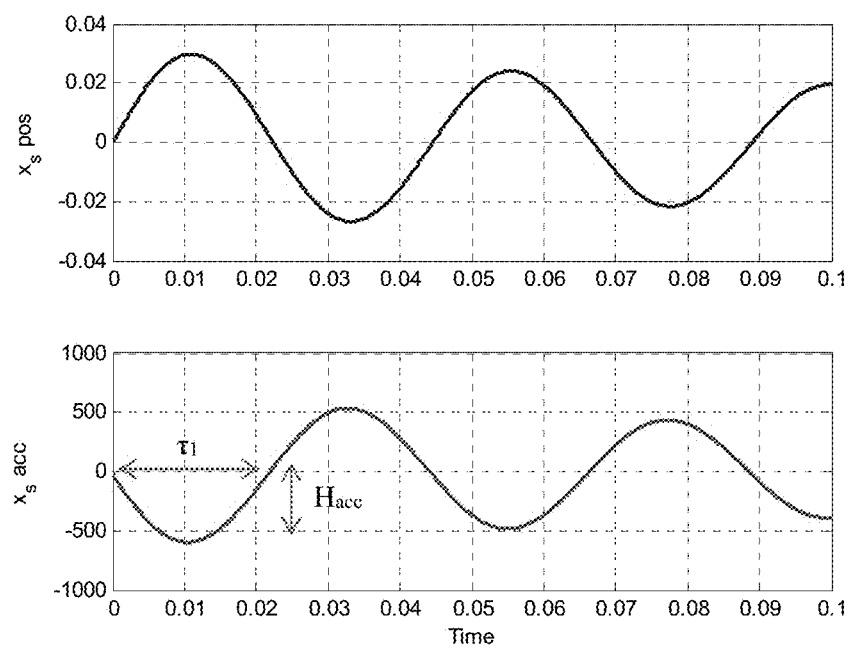

FIG. 12 shows the time history of a single impact calculated for $m_1=1$ kg, $h_0=1$ m, $g=9.8$ m/s$^2$, $t_s=9.5$ Ns/m, $k_s=20\times10^3$ N/m. The displacement of mass $m_1$ is shown by the upper line, and its acceleration is marked by the lower line.

Figure 13:
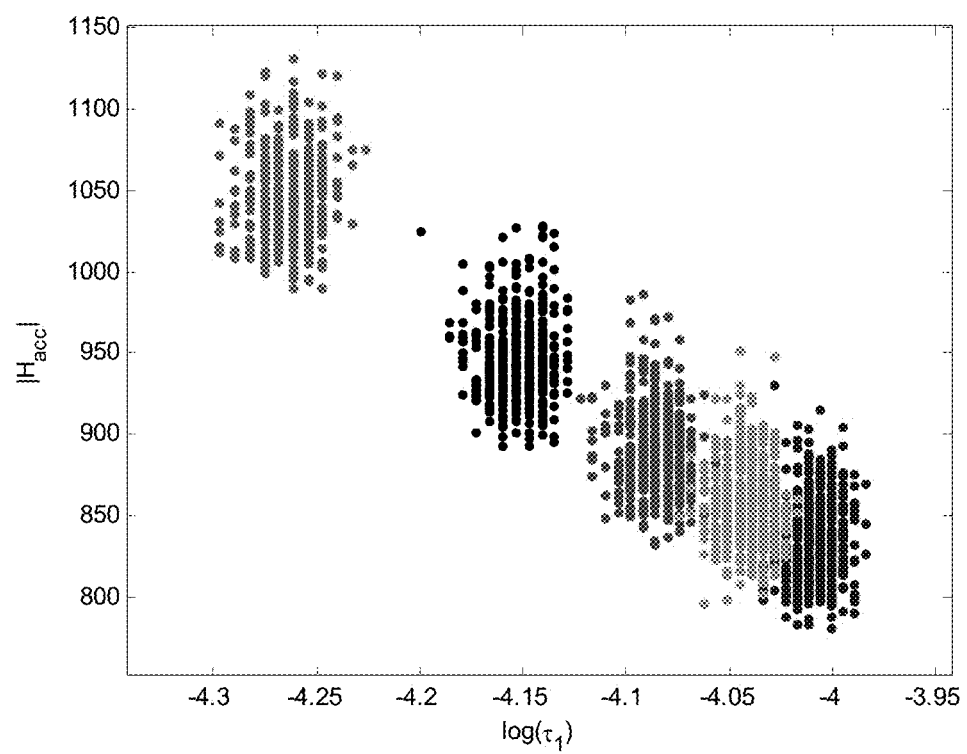

FIG. 13 shows an impact map with various stiffness coefficients calculated for $m_1=1$ kg, $h_0=1$ m, $g=9.8$ m/s$^2$, $t_s=9.5$ Ns/m, $k_s=30\times10^3$ N/m (lower left dot groups), $k_s=32\times10^3$ N/m (next higher dot group), $k_s=35\times10^3$ N/m (next higher dot group), $k_s=40\times10^3$ N/m (next higher dot group), and $k_s=50\times10^3$ N/m (upper right dot group).

Figure 14:
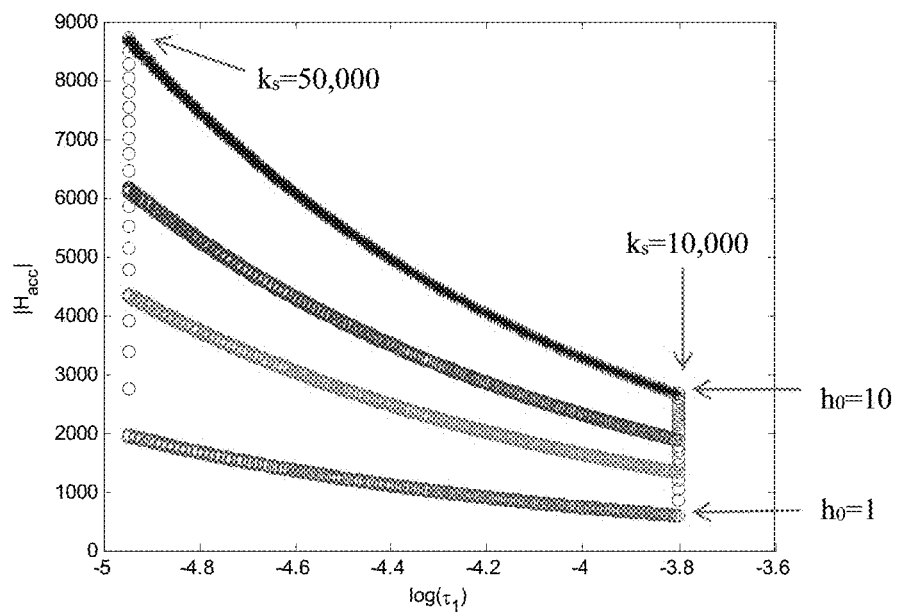

FIG. 14 shows an impact map with various stiffness coefficients and different impact velocity calculated for $m_1=1$ kg, $g=9.8$ m/s$^2$, $t_s=9.5$ Ns/m.

Figure 15:
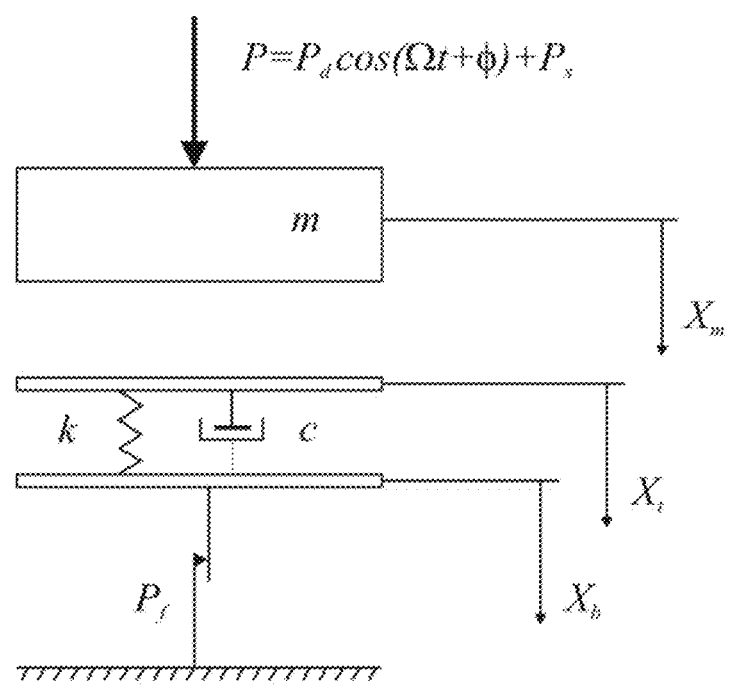

FIG. 15 shows a physical model of drifting oscillator.

Figure 16:
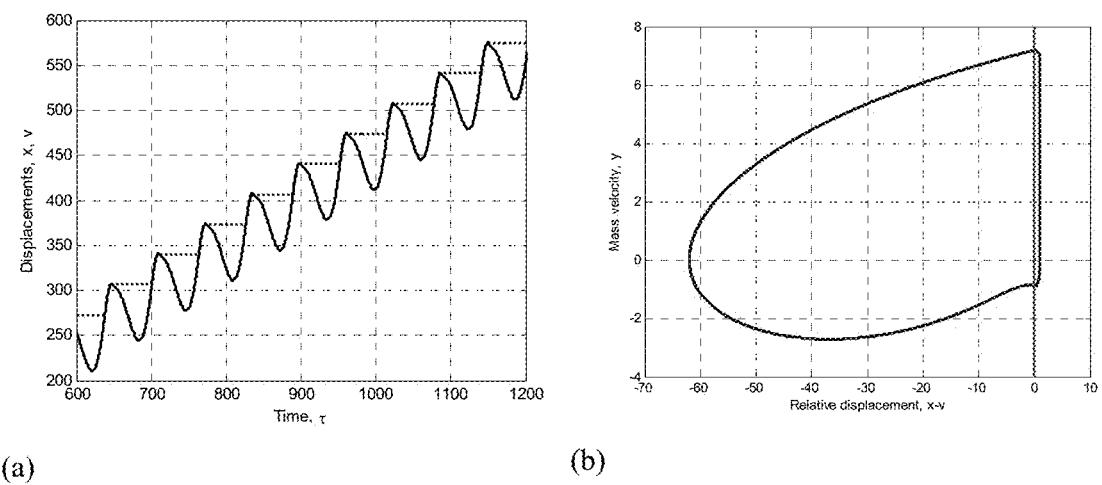

FIG. 16 (a) shows displacement of the mass, x (solid line) and slider bottom, v (dash line) versus time, τ calculated for $a=0.3$, $b=0.16$ $\xi=0.05$, $\omega=0.02$, and $\varphi=\pi/2$. FIG. 16 (b) shows the phase portrait (curved line) with impact surface (straight line).

Figure 17:
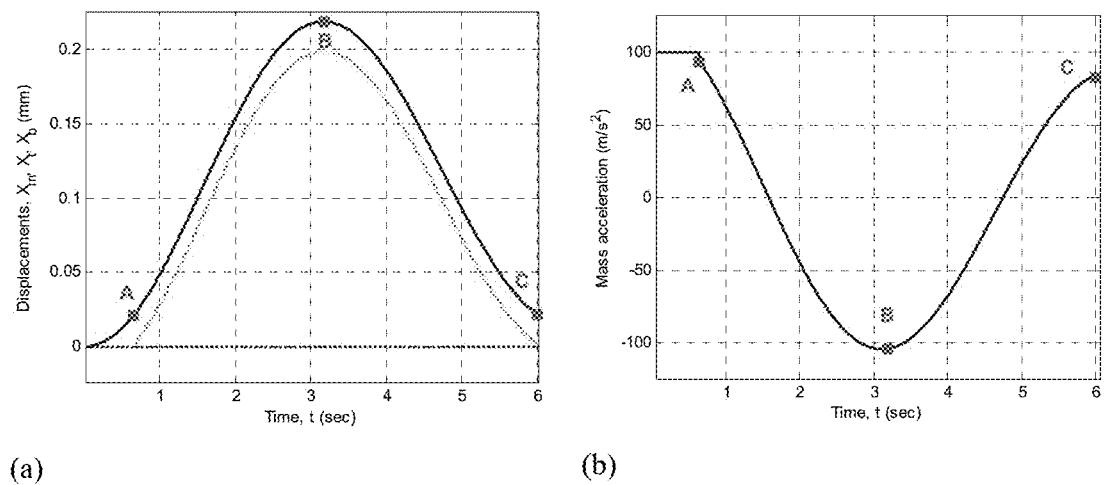

FIG. 17 (a) shows displacement of the mass (solid line), slider top (dash line), and slider bottom (dotted line) (b) acceleration of the mass calculated for $a=0.1$, $b=0$, $\xi=0.05$, $\omega=0.1$, $g=0.02$, and $\varphi=\pi/2$.

Figure 18:
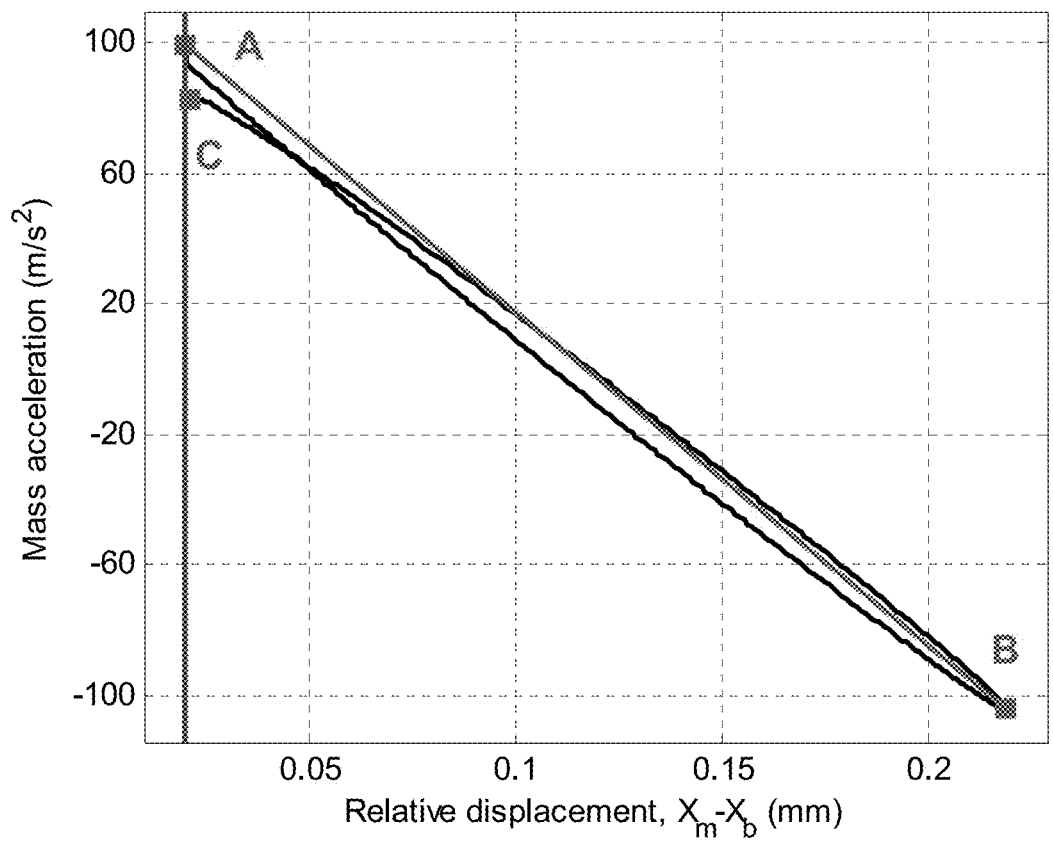

FIG. 18 shows the trajectory of acceleration of the mass versus relative displacement (curved line) with impact surface (vertical line) calculated for $a=0.1$, $b=0$, $\xi=0.05$, $\omega=0.1$, $g=0.02$, and $\varphi=\pi/2$.

Figure 19:
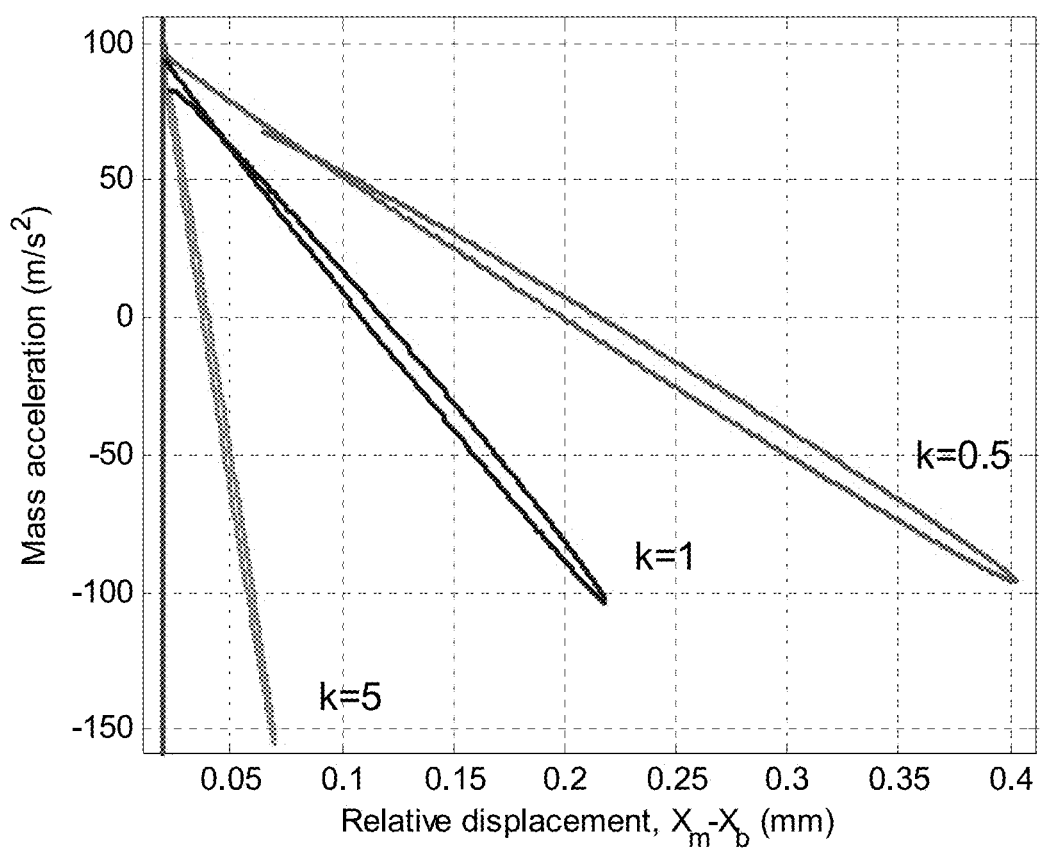

FIG. 19 shows trajectories of mass acceleration versus relative displacement with impact surface (leftmost line) calculated for $a=0.1$, $b=0$, $\xi=0.05$, $\omega=0.1$, $G=0.02$, $\varphi=\pi/2$, $k=0.5$ (rightmost line), $k=1$ (middle right line), and $k=5$ (middle left line).

Figure 20:
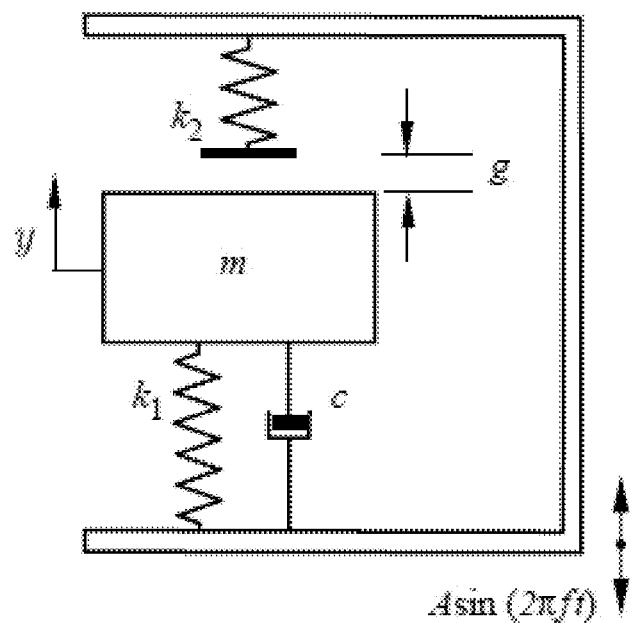

FIG. 20 shows a mathematical model of an impact oscillator (see Ing, J., Pavlovskaia, E., Wiercigroch, M., Soumitro, B. "Experimental study of impact oscillator with one-sided elastic constraint". Phil. Trans. R. Soc. A, 366 (2008), 679-705).

Figure 21:
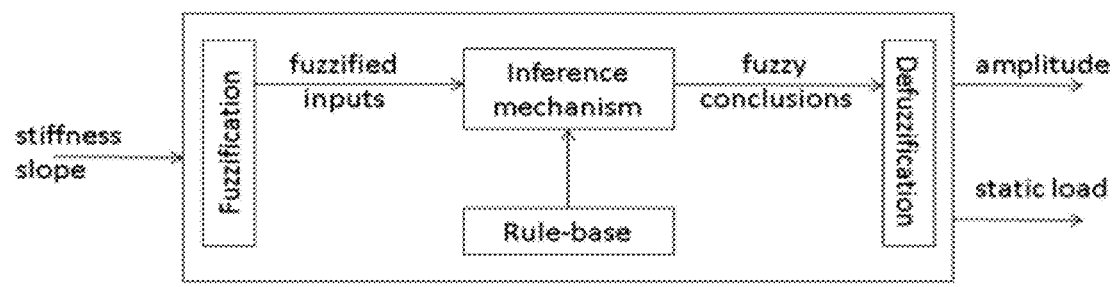

FIG. 21 shows a schematic of a fuzzy control algorithm.

Figure 22:
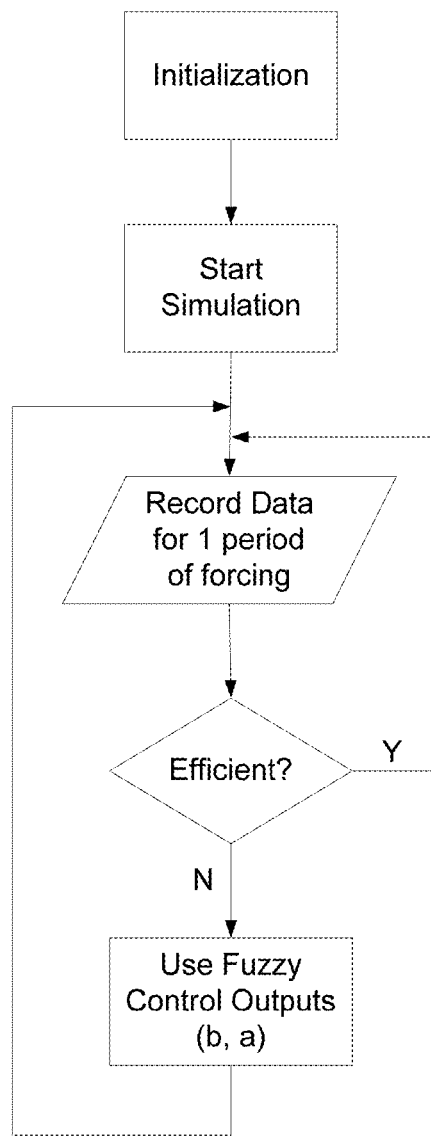

FIG. 22 shows a flow chart of the present fuzzy control process.

Figure 23:
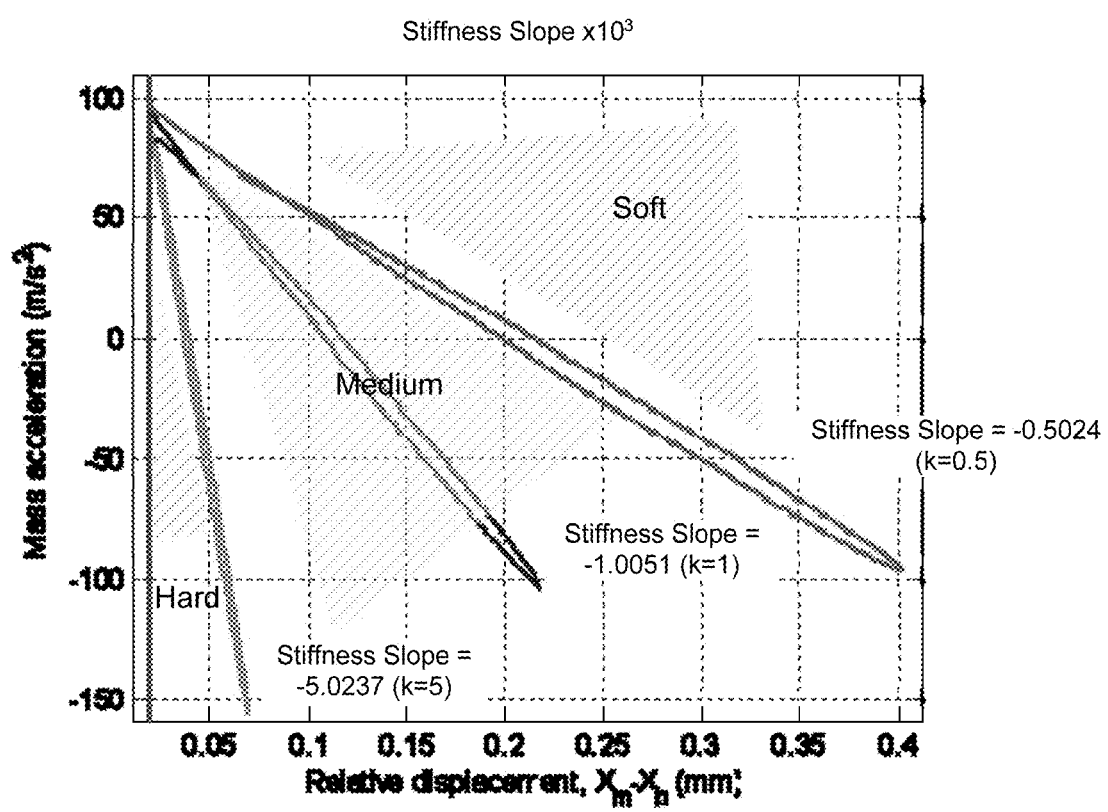

FIG. 23 shows a schematic of fuzzification of stiffness slope.

Figure 24:
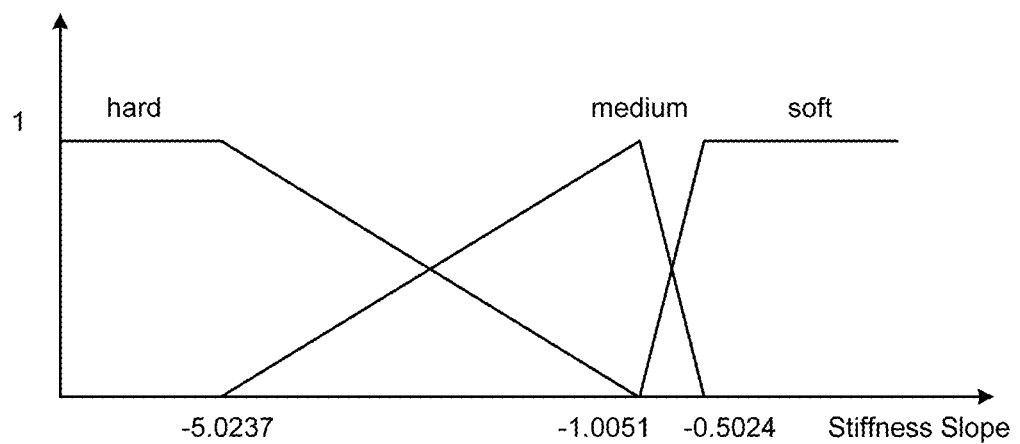

FIG. 24 shows a membership function of stiffness slope.

Figure 25:
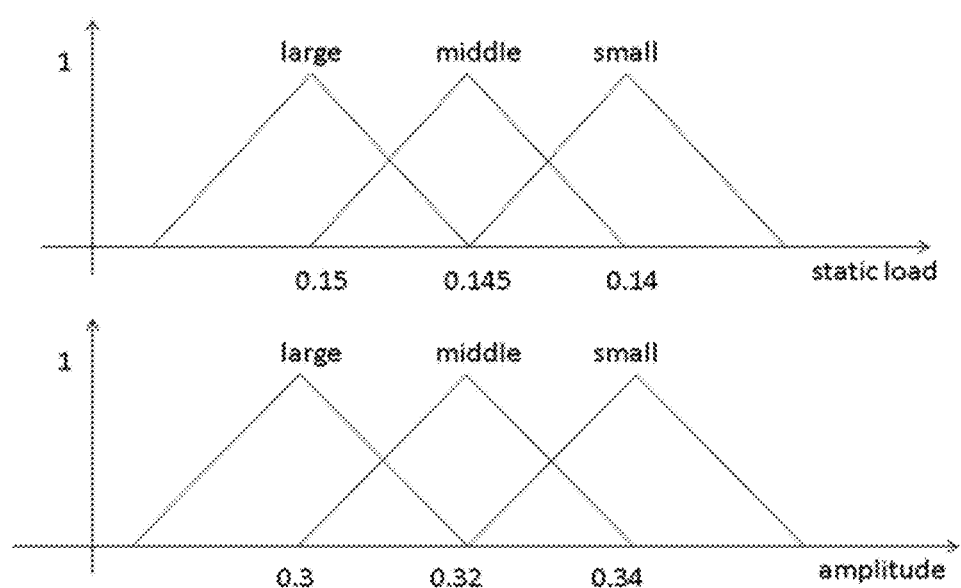

FIG. 25 shows membership functions of static load, b and amplitude of excitation, a.

Figure 26:
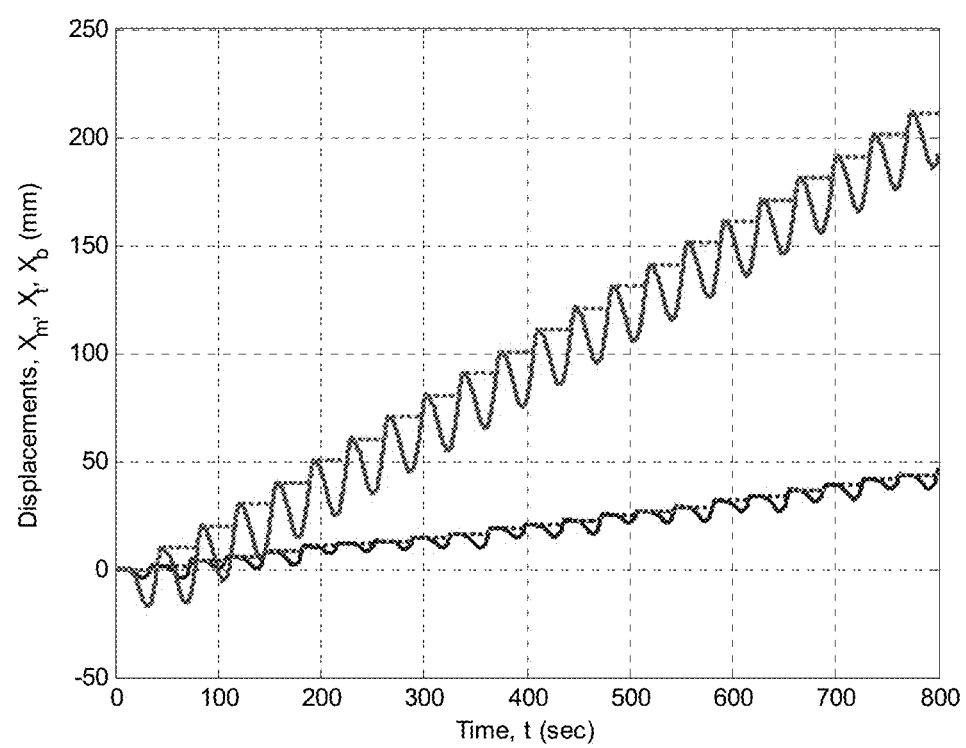

FIG. 26 shows a time history of displacements calculated for $m=1$, $P_f=1$, $\xi=0.05$, $\omega=0.1$, $g=0.02$, $\varphi=\pi/2$, $k=3$, $b=0.13$, $a=0.2$ (lower lines) and $b=0.1432$, $a=0.3126$ (upper lines).

Figure 27:
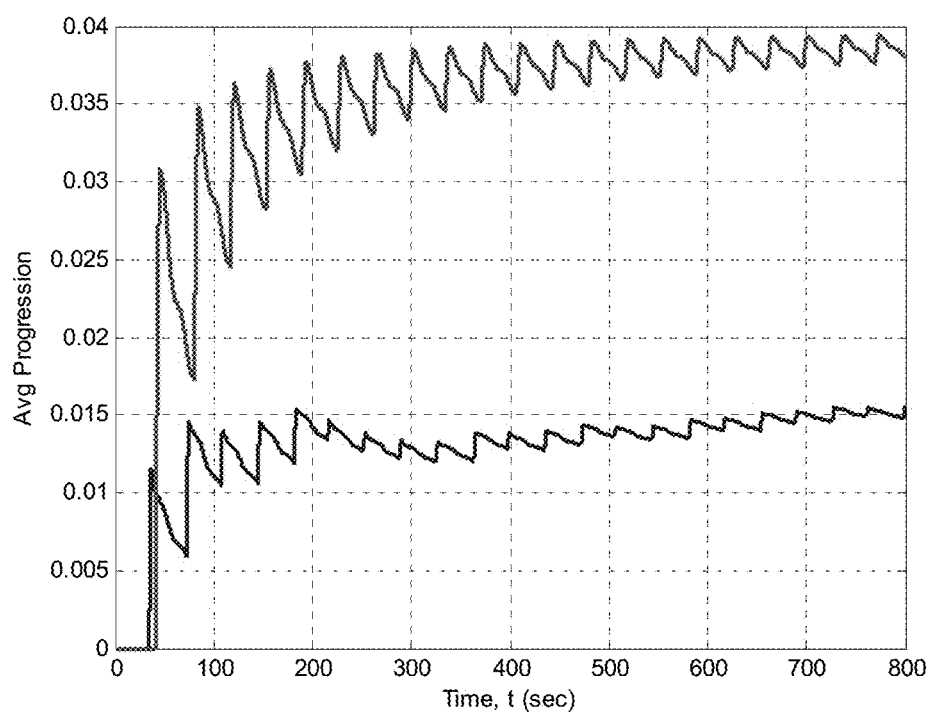

FIG. 27 shows a time history of average progressions calculated for $m=1$, $Pf=1$, $\xi=0.05$, $\omega=0.1$, $g=0.02$, $\varphi=\pi/2$, $k=3$, $b=0.13$, $a=0.2$ (lower lines) and $b=0.1432$, $a=0.3126$ (upper lines).

FIG. 28 shows time histories of the displacement at (a) 0.75 kN, (b) 1.0 kN, (c) 1.25 kN, (d) 1.5 kN, (e) 1.75 kN and (0 2.0 kN static load and 2.5 kN dynamic force amplitude. (top left line conventional drilling while bottom right line is RED).

FIG. 29 shows the relation between (a) improvement factor and (b) progression and static force for dynamic amplitude of 2.5 kN.

FIG. 30 shows time histories of the displacement at (a) 1.5 kN, (b) 2.5 kN, (c) 3.5 kN and (d) 5 kN amplitude of excitation and static load of 1 kN. (the upper left line is conventional drilling while the lower right line is RED).

FIG. 31 shows the variation of amplitude of excitation and (a) rate of penetration and (b) improvement factor.

FIG. 32 shows time histories of the displacement at (a) 150 Hz, (b) 180 Hz, (c) 190 Hz, (d) 200 Hz and (e) 210 Hz frequency of excitation and static load of 1.75 kN. (upper left line is conventional drilling while lower right line is RED).

FIG. 33 shows the variation of frequency of excitation and (a) rate of penetration and (b) improvement factor.

FIG. 34 shows time histories of the displacement at (a) 30 rpm, (b) 60rpm, (c) 90 rpm and (d) 120 rpm at frequency of excitation 200 Hz and static load of 1.75 kN. (upper left line is conventional drilling while lower right line is RED).

FIG. 35 shows the variation of rotary speed and (a) rate of penetration and (b) improvement factor.

The invention will now be described in more detail.

As has been mentioned above, the present invention provides a method for controlling a resonance enhanced rotary drill comprising a drilling module and a control system for controlling one or more drilling parameters of the drilling module, which method comprises:

(a) employing one or more initial characteristics of the material being drilled, and/or one or more initial drilling parameters to control the drilling module;

(b) measuring one or more current drilling parameters to obtain one or more measured drilling parameters;

(c) employing the one or more measured drilling parameters as an input in the control system, in order to obtain an output from the control system, which output comprises one or more calculated characteristics of the material being drilled;

(d) employing the one or more calculated characteristics of the material being drilled, and/or the one or more measured drilling parameters, as an input in the control system, in order to obtain an output from the control system, which output comprises one or more calculated drilling parameters;

(e) optionally applying the one or more calculated drilling parameters to the drilling module;

(f) optionally repeating steps (b), (c) (d) and (e).

In some embodiments of the present invention, in step (d) one or more calculated drilling parameters from a previous iteration of the control process may be employed in addition to the measured drilling parameters as further input to determine the calculated drilling parameters. This may occur, for example, when not all drilling parameters have been measured in an iteration. In addition, or alternatively, where calculated values of the material characteristics are not available, but then calculated values from a previous iteration may be used instead.

In step (a), the step of "employing . . . to control the drilling module" may mean "applying" or "sending" information concerning the one or more initial characteristics of the material being drilled to the control system and/or to the drilling module. Accordingly, the present invention also provides a method for controlling a resonance enhanced rotary drill comprising a drilling module and a control system for controlling one or more drilling parameters of the drilling module, which method comprises:

(a) applying one or more initial characteristics of the material being drilled, and/or one or more initial drilling parameters to the control system and/or to the drilling module;
(b) measuring one or more current drilling parameters to obtain one or more measured drilling parameters;
(c) employing the one or more measured drilling parameters as an input in the control system, in order to obtain an output from the control system, which output comprises one or more calculated characteristics of the material being drilled;
(d) employing the one or more calculated characteristics of the material being drilled, and/or the one or more measured drilling parameters, as an input in the control system, in order to obtain an output from the control system, which output comprises one or more calculated drilling parameters;
(e) optionally applying the one or more calculated drilling parameters to the drilling module;
(f) optionally repeating steps (b), (c) (d) and (e).

In the present invention, the drilling parameters are not especially limited and may be any parameters useful in controlling the drilling process. The number of parameters is also not especially limited, provided that at least one is employed. In some embodiments the number of parameters may be 2 or more, 3 or more, 4 or more, 5 or more, 6 or more, 7 or more, 8 or more, 9 or more, or 10 or more. Typically the drilling parameters are selected from the following:

(a) axial drill force on the material being drilled (also called "weight on bit" (WOB), or "static force")
(b) velocity or speed of the drill (or drill bit or drilling module), and typically the velocity or speed through the material being drilled (also known as the "rate of progression"(ROP));
(c) the acceleration of the drill (or drill bit or drilling module), and typically the acceleration through the material being drilled;
(d) the frequency of oscillation of the drill;
(e) the amplitude of oscillation of the drill;
(f) the oscillatory axial drill force on the material being drilled (also called the "dynamic force");
(g) the rotary velocity or rotary speed of the drill;
(h) the rotary force or torque of the drill on the material being drilled;
(i) fluid flow rate; and
(j) relative displacement of the drill-bit.

In this context, the fluid flow rate comprises the amount of fluid passing through, around and/or over the drill-bit. Typically, fluid is passed across the drilling zone for lubrication, cooling and debris removal purposes. In some cases (such as with ROP) the drilling parameters are not directly applicable to the drilling module, but are parameters that can be applied indirectly by applying one or more of the other parameters, to which the indirect parameter is related.

Any one or more of these parameters may be maximised, minimised or optimised, depending upon the conditions, the drilling methods, the material (rock) type, and the aims of the process. However, typically the indirect drilling parameters such as ROP are desired for maximisation or optimisation. Another such parameter, for example, may be drill-bit wear, which should be minimised.

In the present invention, the characteristics of the material to be drilled are not especially limited and may be any characteristics useful in controlling the drilling process. The number of characteristics is also not especially limited, provided that at least one is employed. In some embodiments the number of characteristics may be 2 or more, 3 or more, 4 or more, 5 or more, 6 or more, 7 or more, 8 or more, 9 or more, or 10 or more. Typically the characteristics of the material to be drilled are selected from the following:

(a) the compressive strength of the material
(b) the stiffness or the effective stiffness of the material;
(c) the yield strength of the material;
(d) the impact strength of the material;
(e) the fatigue strength of the material;
(f) the tensile strength of the material;
(g) the shear strength of the material;
(h) the hardness of the material;
(i) the density of the material;
(j) the Young's modulus of the material; and
(k) the Poisson's ratio of the material.

Typically the one or more initial characteristics of the material being drilled in step (a) are obtained from empirical information, preferably from a database. Further typically, the one or more initial drilling parameters in step (a) are obtained from empirical information, preferably from a database. The database is typically populated from information obtained during testing of the drilling module (in various sizes, diameters, weights etc.) on a variety of rock types and rock formations.

The one or more calculated characteristics of the material being drilled in step (c) may be obtained in any appropriate way using calculation or estimation but typically they are obtained using one or more models, such as one or more empirical and/or mathematical models. The models are not especially limited providing that they are valid models for calculating the parameters in question (that is to say they are capable of making a reasonable estimation of the desired parameters). Typically the models are empirical models (such as models which are developed from empirical data rather than from a physics- or mathematics-based theorems). Preferably, the one or more models comprise a neural network. In some embodiments the one or more models may comprise a NARMAX (Nonlinear AutoRegressive Moving Average with eXogenous inputs) model and/or an impact based model and/or a penetration based model. Any model used may be used in conjunction with one or more other models if desired. In some cases the use of several different models together or separately may provide more accurate results.

In the present invention the one or more calculated drilling parameters in step (d) may be obtained in any appropriate way using calculation or estimation but typically they are obtained using a fuzzy logic model. The fuzzy logic model employed is not especially limited and any fuzzy logic model known in the art may be employed. Typically, the fuzzy logic model used in the invention comprises:

(i) processing the step (d) input parameters to produce fuzzy input parameters;
(ii) processing the fuzzy input parameters to produce fuzzy conclusions; and (iii) processing the fuzzy conclusions to give the step (d) output parameters.

In some embodiments step (i) comprises employing a membership function to convert the one or more input parameters to one or more fuzzy input parameters. Preferably, step (ii) comprises an inference mechanism and a rule base, wherein the inference mechanism is employed to select from the rule base one or more rules to apply based upon the input parameters and/or the fuzzy input parameters of step (i), and wherein the one or more rules are applied to one or more fuzzy input parameters to convert them to one or more fuzzy conclusions. Typically but not exclusively, step (iii) comprises employing a membership function and/or a centre of gravity method to convert the one or more fuzzy conclusions to the step (d) output parameters.

In some preferred embodiments of the invention, the model for the characteristics of the material being drilled employs a neural network and the model for the drilling parameters uses fuzzy logic.

The method of measuring the one or more current drilling parameters (the drilling parameters existing in the current iteration of the process before the calculated parameters are applied) in step (b) is not especially limited. However, preferably this is carried out using one or more sensors incorporated in the drilling module. The one or more sensors are not especially limited provided that they are capable of measuring the particular parameters involved, but in preferred embodiments the sensors are selected from a load cell, and eddy current sensor, and an accelerometer, and sensor(s) for measuring current and/or voltage changes in the module, and any combination of one or more of each of these.

Further parameters may also be used in the method, such as fixed parameters relating to the drilling equipment which will not change (weight, size (diameter of drill bit, diameter of bore hole, length of drilling module) etc.) and external parameters that may or may not be fixed (such as temperature, pressure, etc.). Typically, but not exclusively, the further parameters are selected from the following:
(a) the diameter of the drill bit;
(b) the mass of the drilling module;
(c) the temperature of the material being drilled;
(d) the geostatic pressure or pore pressure of the material being drilled;
(e) the length of the drilling module
(f) the width of the bore hole; and
(e) the depth of the bore hole.

The present invention also provides a method of drilling, which method comprises operating a resonance enhanced drill to drill a material, wherein the resonance enhanced drill is controlled according to a method as defined above.

The present invention further provides a control system for resonance enhanced drilling, which control system comprises:
(a) a controller for determining one or more characteristics of a material to be drilled, and
(b) a controller for determining one or more drilling parameters;
wherein the control system is configured to perform a method as defined above.

The invention still further provides an apparatus for resonance enhanced drilling, which apparatus comprises:
(a) a drilling module; and
(b) a control system as defined above.

Resonance enhanced drilling

As has been emphasised above, the present invention is concerned with the control of a resonance enhanced drilling process or apparatus. The method of the invention may be applied to conventional RED methods, such as those disclosed in WO 2007/141550 and WO 2011/032874. In such known methods, typically the parameters of motion of the oscillator are controlled, based on a feedback mechanism which uses sensors to directly determine the compressive strength of the rock being drilled. In the present method, a much more sophisticated feedback is employed, as described above.

Generally, in known RED methods, during operation, the rotary drill-bit is rotated and an axially oriented dynamic loading is applied to the drill-bit by an oscillator to generate a crack propagation zone to aid the rotary drill bit in cutting though material. In known methods, the oscillator is typically controlled as described in WO 2011/032874. In these methods, the ranges for the frequency and dynamic force are based on the analysis provided below. In the present invention, the details below represent a useful guide as a process to which the more sophisticated control process may be applied.

The compressive strength of the formation gives a lower bound on the necessary impact forces. The minimum required amplitude of the dynamic force has been calculated as:

$$F_d = \frac{\pi}{4} D_{eff}^2 U_s.$$

$D_{eff}$ is an effective diameter of the rotary drill bit which is the diameter D of the drill-bit scaled according to the fraction of the drill-bit which contacts the material being drilled. Thus, the effective diameter $D_{eff}$ may be defined as:

$$D_{eff} = \sqrt{S_{contact}} D,$$

where $S_{contact}$ is a scaling factor corresponding to the fraction of the drill-bit which contacts the material being drilled. For example, estimating that only 5% of the drill-bit surface is in contact with the material being drilled, an effective diameter $D_{eff}$ can be defined as:

$$D_{eff} = \sqrt{0.05} D.$$

The aforementioned calculations provide a lower bound for the dynamic force of the oscillator. Utilizing a dynamic force greater than this lower bound generates a crack propagation zone in front of the drill-bit during operation. However, if the dynamic force is too large then the crack propagation zone will extend far from the drill bit compromising borehole stability and reducing borehole quality. In addition, if the dynamic force imparted on the rotary drill by the oscillator is too large then accelerated and catastrophic tool wear and/or failure may result.

Parameters

As has been made clear above, an important part of the present control process is the modelling of drilling parameters, using measured drilling parameters and modelled material characteristics as input.

To adequately model the influence of the various drilling parameters on RED, a physical model that takes into account the interaction of the drilling module (especially the drill-bit) and the material (e.g. rock) is required. Such a model should preferably not only capture the material fragmentation process but also simulate the drilling dynamics of the system. This can be accomplished, as exemplified below, provided a mechanical response of the material is adequately modelled. These responses can then be used in the drilling parameter calculation controller, for example to build up a suitable rule-base and inference mechanism for in a fuzzy logic process.

The performance of Resonance Enhanced Drilling (RED), like any other method of borehole creation, depends on the input parameters applied. For example, the weight on bit (WOB), rotary speed, force amplitude and frequency of excitation are expected to have significant impact on the on the rates of progression and percentage improvement over conventional drilling that is achieved. An understanding of how these parameters individually influence the outcome of RED is important to the determination of the combination required for the best performance.

The inventor has performed a simulation based on experimentally determined properties for sandstone. The drill-bit and the remainder drill-string were considered rigid elements.

The results obtained for the influence of the WOB, rotary speed, amplitude and frequency of excitation were investigated and observation compared with the earlier experimental studies.

Influence of WOB

The weight on bit (WOB) provides to the force necessary for rock fragmentation in conventional rotary drilling. However, in RED the force is a combination of a static force (or WOB) and a harmonic force. It is therefore necessary to understand the effect of the WOB on the process. To investigate the its influence on the performance of the RED, finite element simulations were conducted. The material properties, rotary speed, amplitude and frequency of excitation were kept constant while the static force can vary between a minimum and a maximum, such as from 0.75 to 2 kN.

FIG. 28 shows the time histories of the displacement of the drill-bit for each load used. It is observed that gradient of the times histories during the conventional drilling phase of the simulation was always lower to that experienced during the RED. This is qualitatively similar to the experimental outcomes in the laboratory.

In FIG. 29 (a) the variation of the improvement factor for RED is depicted. The value obtained was fairly constant for all WOB used. It is worth mentioning that this does not correspond to experiments. This is due to the fact that real rocks used in the experiment are heterogeneous, while the rock in this model has homogenous properties. Hence a fairly constant value is expected to be obtained for the improvement factor. FIG. 29 (b), is a graphical representation of the relationship between the WOB and the progression for different WOB. It is observed that while the progression increases with increasing WOB till the 1.75 kN after which a drop is observed.

Influence of amplitude of excitation

The energy available when the drill-bit impacts the rock in RED is a function of the amplitude of the harmonic excitation. However, there is a constraint imposed on the maximum value of attainable due to power available to the RED actuator. It is thus useful to establish how it influences the overall performance of the drilling process. To study the effect of changes to the amplitude, three simulations were carried out at different force amplitudes while keeping the other WOB (static force) and other drilling parameters constant.

FIG. 30 presents the time histories of the displacement of the drill-bit during the convention drilling and RED. It is noted that average penetration rates obtained during the RED phase was always greater than what was achieved during the conventional drilling phase of the simulation.

In FIG. 31 (a), the graph of the progression rates against the amplitude of excitation is presented. The rate of progression increases with amplitudes and the same can be said of that the improvement factor (FIG. 31 (b)). The observations agree with results obtained from experiments.

Influence of frequency of excitation

The frequency of excitation of the dynamic force determines the rate of energy available for rock fragmentation per unit time. Consequently, the understanding of how the frequency affects the efficiency of RED would assist in selecting the best value to use in a drilling operation.

The influence of the frequency on performance was also studied using the same finite element model. The value of the frequency was varied while other model parameters were held constant. The simulation was conducted from 150, 180, 190, 200 and 210 Hz. The results are depicted in terms of the time histories of displacement of the drill-bit in the FIG. 32.

FIG. 33(a) shows that the relationship between the frequency and the rate of penetration, while in FIG. 33(b) the improvement factor obtained for the different speed are graphically presented. The penetration rates increased with increasing frequency for the range used. It is also observed that gradient of the graph became significantly higher beyond 180 Hz. This suggests that if simulation for higher frequencies were carried out, it may be possible to find the optimum value need for best performance. Similar results were obtained for the improvement factor as shown in FIG. 33(b). These types of the outcomes were observed in RED experiments.

Influence of rotary speed

The rotary speed of a drill-string contributes to the efficiency of the drilling process. It is known that the rotary speed plays an important role in rock fragmentation and cuttings removal in conventional rotary drilling. It is useful to study its influence on the performance of RED.

A study was conducted for rotary speed varying from 30 rpm to 120 rpm in steps of 30 rpm. The results of the analysis are graphically presented in FIG. 34 in terms of the time histories of the displacement of the drill-bit. The average rate of penetration for the RED phase always exceeded that for conventional rotary drilling.

From FIGS. 34 and 35(a), it is also noted that as the drilling assembly moved faster with increasing rotary speed both for RED and conventional drilling. FIG. 35(b) is a graphical summary of the improvement factor obtained for the various speeds. The improvement factor is observed to remain fairly constant for all rotary speeds applied. These results agree with that obtained from experiments.

Summary of parameter influence

In particular, it has been shown that the WOB and dynamic force both contribute to the force required for rock fragmentation. As such, their respective amounts affect the efficiency of the drilling process. The WOB has been shown to have an optimal value for best performance to be achieved. Increasing the amplitude of excitation produced increases penetration rates and improvement factors for RED.

The data show that the frequency of excitation plays a significant role in the amount of energy per unit time available for rock fragmentation. In addition, the rotary speed has been shown to determine the rate of material removal from the face of the drill-bit. The rate of penetration has been shown to increase with increasing rotary speed.

All results obtained from the finite element simulations conducted were qualitatively similar to those observed from RED experiments.

In summary, to adequately model the influence of the various drilling parameters on RED, physical (or empirical) models that take into account the drilling module (e.g. drill-bit) and material (e.g. rock) interactions have been developed. These models have been shown to be suitable in the determination of the best drilling parameters for rocks and other materials and may be employed in the controller as part of the control process of the invention. The models may be used to build up a suitable rule-base and inference mechanism in a fuzzy logic controller for calculating drilling parameters, or may be used in other control strategies.

Control system

Figure 4:
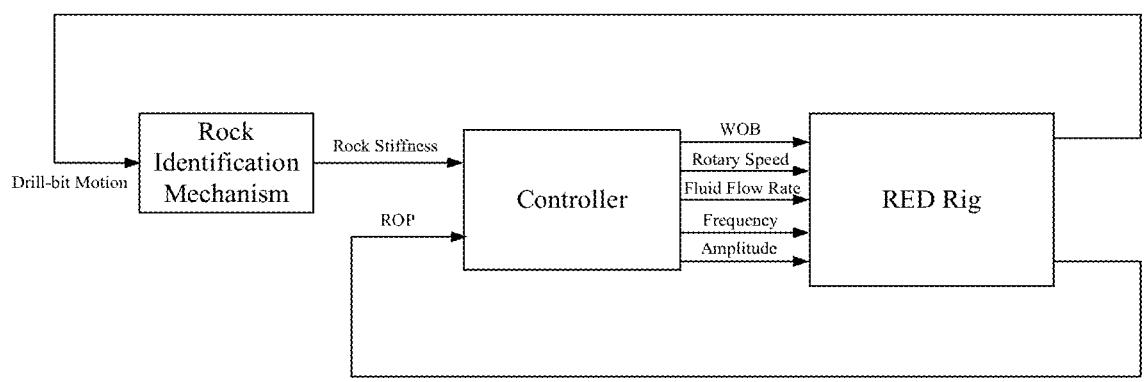

An example of a control system according to the present invention is shown in FIG. 4. In this scheme, the controller for calculating the characteristics of the material being drilled is labelled 'Rock Identification Mechanism', the controller for calculating the drilling parameters is labelled 'Controller', and various exemplary material characteristics and drilling parameters are shown as being employed in the control method.

Controller for calculating drilling parameters

A simulation study by the inventor has demonstrated that the optimum amplitude of excitation and WOB which gave the best penetration rate varied depending on rock stiffness. The fuzzy control strategy of the present invention is preferred to adjust the optimal frequency and amplitude (or other drilling parameters) of the RED drilling module for different rock (or other material) conditions.

A schematic of the proposed method is presented in FIG. 21, which contains fuzzification, an inference mechanism, a rule-base, and defuzzification. Fuzzification is a process that converts the crisp inputs into linguistic terms, and then put them in the inference mechanism based on a predefined rule-base. Later on, the linguistic decision obtained from the inference mechanism is converted to crisp control parameters for the drifting oscillator. As shown in FIG. 21, the present control system has at least one input (for example stiffness slope, as in the Figure) and at least one output (two outputs in the Figure, which in this example are amplitude of excitation and static force).

A flow chart of the present control process is given in FIG. 22. As shown from this graph, the process begins with initialization and recordal of the data for one period of forcing once simulation starts. Then the fuzzy system evaluates whether the current control parameters (b and a) are the best ones that can produce the best efficiency under current stiffness condition. If so, the system will continue to use the current control parameters; if not, the crisp control parameters calculated by the fuzzy control system (the updated, or calculated, drilling parameters) will be adopted.

Fuzzification

The fuzzy controller has at least one input signal (such as stiffness slope in this example). The inference mechanism will choose a control rule based on the fuzzified input. The fuzzification of stiffness slope is presented in FIG. 23. As seen in FIG. 23, a stiffness slope which is larger than −0.5024 is defined as "soft", a stiffness slope between −0.5024 and −5.0237 is defined as "medium", and the stiffness slope which is less than −5.0237 is defined as "hard". A summary of the fuzzification is given in Table 4, and the membership function of stiffness slope is given in FIG. 24.

TABLE 4 fuzzification of stiffness slope
Stiffness slope (SS)

| | |
|---|---|
| "soft" | SS > −0.5024 |
| "medium" | −5.0237 < SS < −0.5024 |
| "hard" | SS < −5.0237 |

Rule-base

Since it is assumed that the static load is fixed for this example, the objective of the fuzzy controller may then be converted to find (for example) the optimal amplitude of excitation which generates the best average progression. Mamdani model-based fuzzy control rules for this example are given as follows:

If stiffness is SOFT, WOB is LARGE and amplitude of excitation is SMALL;
If stiffness is MEDIUM, WOB is MIDDLE and amplitude of excitation is MIDDLE;
If stiffness is HARD, WOB is SMALL and amplitude of excitation is LARGE.

Other rules for other relationships between parameters may be applied as desired. When there are several inputs, different rules may be applied for different input parameters. Similarly, when optimization of different parameters is required, further different rules may be applied. The inference mechanism may be adapted to ensure that the correct rules are matched with the inputs employed and the parameters being optimized.

Defuzzification

FIG. 25 shows the membership functions of static load and amplitude of excitation for defuzzification of fuzzy conclusions from an inference mechanism. It is particularly preferred to use centre of gravity methods through which a crisp output can be calculated using the centre of total area of each implied fuzzy set.

Numerical Results

The inventor carried out simulation studies for the proposed fuzzy controller by using the following parameters: m=1, $P_f$=1, $\xi$=0.05, $\omega$=0.1, g=0.02 and $\varphi=\pi/2$. The simulation results using k=3, b=0.13 and a=0.2 are shown in FIG. 26, which are indicated by the lower set of lines. The fuzzy controller indicates the optimum parameters are b=0.1432 and a=0.3126, and the simulation results using the optimum parameters are shown in FIG. 26 which are indicated by the higher set of lines. It is clearly seen that the displacement using the optimum parameters is significantly increased and the improved average progression using the optimum parameters can be seen in FIG. 27.

Controller for calculating characteristics of material being drilled

The controller for calculating characteristics of material being drilled will now be described in more detail. The current control systems and methods may be employed in many types of drilling, and are therefore not limited to large scale drilling, such as drilling through rock. However, typically the invention is well suited to large scale drilling, such as rock drilling in the mining and oil industries. Therefore, the material being drilled is typically a type of rock. In the following, references to rock may nevertheless also be taken to be applicable to other materials too.

Figure 5:
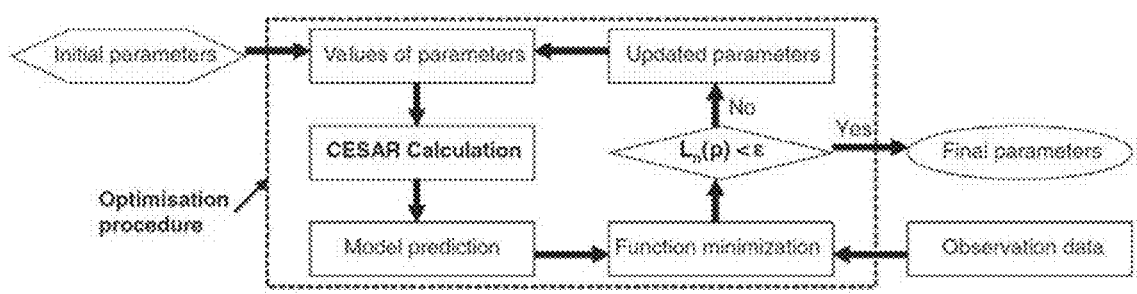
FIG. 5 shows a procedure for signal identification in a controller for calculating or identifying characteristics of the material to be drilled (e.g. a rock identification procedure).

When the material is rock, or any other material, the material identification problem can be formulated in terms of mathematical optimization: Given an observed signal x(t) (obtained from drilling measurements) it is useful to find a model function y(t,p) (p being a parameter of the model) such that the error:

$$L_n(p) = \frac{1}{t_f - t_0} \int_{t_0}^{t_f} \|x(t) - y(t, p)\| dt$$

is minimum. To solve this problem, several algorithms are available, for example the one shown in FIG. 5 based on inverse analysis. However, the successful application of algorithms of this kind requires the existence of robust mathematical models describing the phenomena to be studied, in such a way that the signals y(t, p) can be predicted.

A problem of previous control systems, and a problem underlying the present invention, was that up to present there is no accurate model in physics available to describe the particular characteristics of the rock formations subjected to a drilling process. Accordingly, the inventor determined to apply a different approach. Alternative avenues explored by the inventor include the following empirical models:

Genetic algorithms—based on the genetic pool transition generation after generation, derived from Darwin's evolution theory.
Ant colony algorithms—based on the behaviour of insects.
Tabu research—exploring the local neighbourhood of the desired critical value.
Particle swarm optimization—based on the social behaviour of a group such as birds flying in the sky, or people looking for an exit inside a building.
Artificial neural networks—popular for pattern recognition problems, where the method mimics the learning process of the central nervous systems.

All of these approaches provide useful alternatives to a physics theory for the system. In general, it is preferred in the present invention that such an alternative empirical model is employed. This may or may not be a mathematical model.

Other potentially useful models for identifying material (or rock) characteristics include impact based identification, penetration based identification and NARMAX models.

Neural Network based identification

Figure 6:
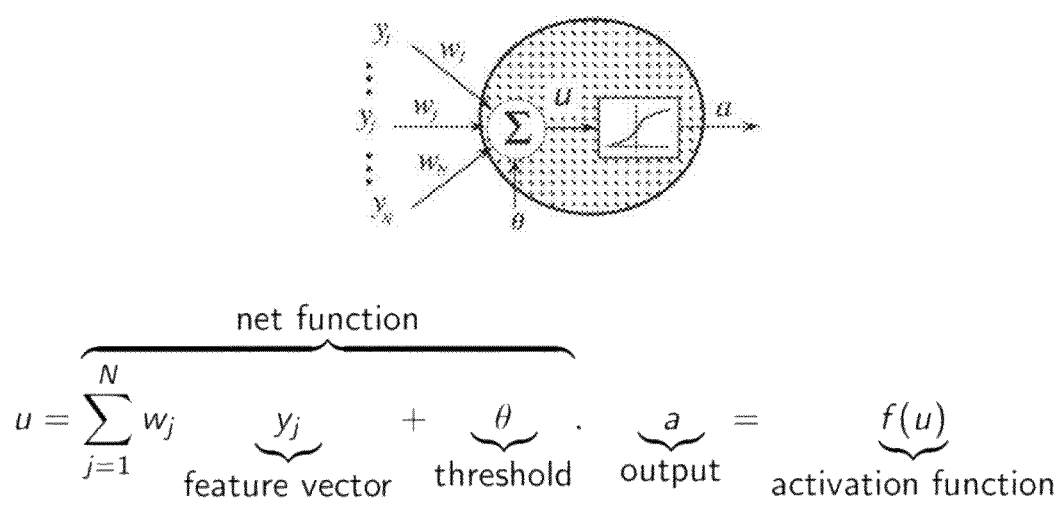
FIG. 6 shows a neuron model for an Artificial Neural Network (ANN).

In the present invention, whilst any of the above empirical models (or any other suitable model) may be employed, Artificial Neural Networks (ANN) are the most preferred for solving the material characteristics (rock characteristics) identification problem. They are particularly useful if the stiffness of the material is one of the parameters to be employed (although they are also useful for other parameters too). An ANN presents the significant advantage that no explicit mathematical model (or physics model) of the phenomenon in question is required. The key point of ANN is to carry out an appropriate learning process for the chosen network. A neuron model for an ANN is shown in FIG. 6.

An ANN is a general mathematical computing paradigm that models the operations of biological neural systems (e.g. learning, classifying, and pattern recognition). The main idea is to define suitable features vectors (measures) that capture the characteristics of the process to be studied, in this case the material (or rock) characteristics under drilling conditions. Once a set of feature vectors has been defined, the ANN is subjected to a learning process, in which the ANN will adjust its coefficients in order to identify correctly the rock properties. In this stage, it is important to have a sufficiently large range of training samples, in such a way that they are representative of the drilling conditions to be expected in the real applications.

In the present invention, there are a number of signals available which can be employed for an ANN identification process. In particular, the position and acceleration of the drill-bit. This allows one to define various features measures, (such as power, peaks, Fourier coefficients, etc.) taken for both position and acceleration signals. This may be illustrated by an experiment. Consider a set of training signals generated under the following drilling conditions:

TABLE 1

Parameters of the experimental data for ANN training.

| Rock | Drill Bit | Frequency (Hz) | Amplitude (V) | WOB (kN) |
|---|---|---|---|---|
| Granite | 3⅞" PDC | 178.83 | 200 | 1.5 |
| Sandstone | 3⅞" Varel 4919 | 178.22 | 180 | 3.5 |

Figure 7:
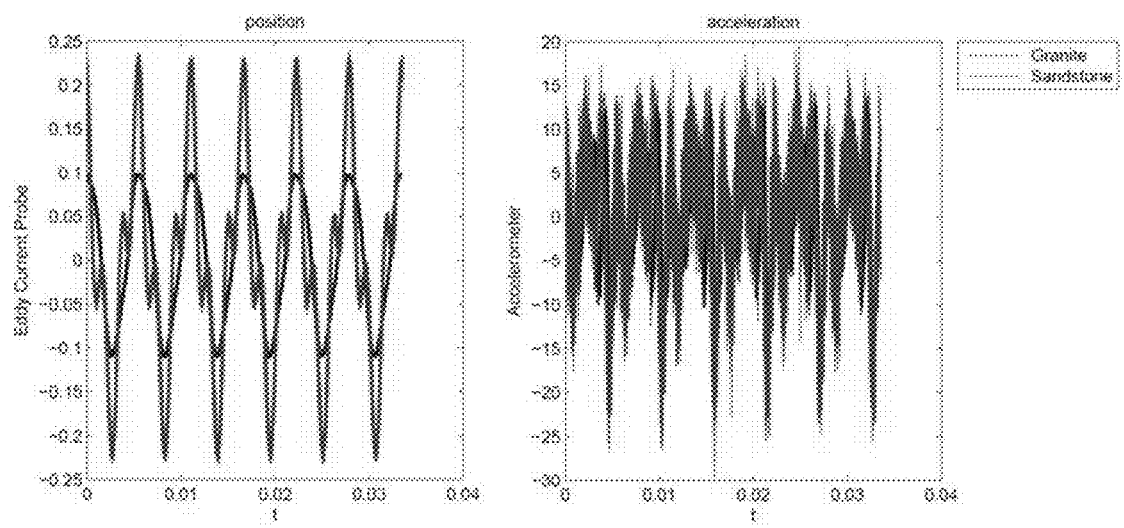
FIG. 7 shows the training signals (position and acceleration signals) generated under the certain drilling conditions, for granite and sandstone.

The training signals (position and acceleration signals) generated under the above mentioned drilling conditions are shown in FIG. 7, for granite and sandstone.

In FIG. 8, various measurements taken for the ANN training are shown. One key aspect of this approach is to take measures that are able to distinguish the characteristics one is interested in, which in this example is the rock type (granite/sandstone). As can be seen in the Figure, the chosen measures effectively accumulate for each of the rock types, thus giving an indication of their capability to identify what type of rock is being drilled.

With these measurements it is possible to carry out the learning algorithm (for which the Matlab ANN toolbox was used) choosing the supervised learning as implementation option. The performance of this procedure can be observed in FIG. 9. As can be seen, the algorithm converges remarkably fast, which means that the underlying problem is well-posed. This is a very important aspect to consider, since the well-posedness of the problem is intimately related to the robustness of the identification technique. This is important in view of the possible harsh conditions under which the rock formations have to be carefully identified. In this regard, the method shows very good convergence characteristics, which is an indication that this technique is a great improvement for calculating real drilling conditions.

Once the ANN has been trained, one may test the network in order to verify its identification capabilities. This can be done by dividing the sample data into two groups: training and testing, in such a way that all the process is carried out with the same set of experimental data. However, in order to illustrate the robustness and effectiveness of the proposed identification technique, a separate set of experimental data was used as detailed below in Table 2:

TABLE 2

Parameters of the experimental data for ANN testing.

| Rock | Drill Bit | Frequency (Hz) | Amplitude (V) | WOB (kN) |
|---|---|---|---|---|
| Granite | 2¼" PDC | 178.22 | 195 | 1.6 |
| Sandstone | 3⅞" Varel 4885 | 178.22 | 180 | 3.5 |

As can be seen, the parameters for the testing data differ from those of the training data, but of course they are reasonably similar. Thus, using this new set of experimental data one may take position and acceleration as main signals and obtain the measures defined previously in order to test the trained network.

The result can be seen in FIG. 10. This is the so-called confusion matrix which shows the absolute number of samples and their percentage corresponding to correctly and non-correctly identified signals. In this case, it can be seen that all the samples accumulate in the diagonal of the confusion matrix, meaning that samples corresponding to class 1 (granite) have been identified by the network as belonging to class 1 and so on. Therefore, this method can be applied and extended in order to implement the rock identification controller shown in FIG. 5.

Impact-based identification

Identification of the material characteristics may also be achieved using a method based on the acceleration of the drill-bit. A simple impact model shown in FIG. 11, where the mass $m_1$ collides with the base modeled as a light fender supported by a light spring with the restitution coefficient $k_s$ and light viscous damper with the damping coefficient $t_s$. The dynamics of the model is governed by the following equation:

$$\ddot{x}_s + 2h_s\dot{x}_s + \alpha_s^2 x_s = 0 \quad (1)$$

where $$h_s = \frac{t_s}{2m_1} \text{ and } \alpha_s^2 = \frac{k_s}{m_1}.$$

The solution of Eq. (1) is as follows:

$$x_s = e^{-h_s\tau}(A \cdot \sin \lambda_s\tau + B \cdot \cos \lambda_s\tau)$$

$$\dot{x}_s = -h_s e^{-h_s\tau}(A \cdot \sin \lambda_s\tau + B \cdot \cos \lambda_s\tau) + \lambda_s e^{-h_s\tau}(A \cdot \cos \lambda_s\tau - B \cdot \sin \lambda_s\tau) \quad (2)$$

where $\lambda_s = \sqrt{\alpha_s^2 - h_s^2}$ is the frequency of the damped oscillations. Assuming that the velocity of the colliding body at the collision is given by $v_0$, one gets the following initial conditions $$\tau = 0 \Rightarrow x_s = 0, \dot{x}_s = v_0$$

So Eq. (2) takes the form $$x_s = e^{-h_s\tau} \frac{v_0}{\lambda_s} \sin\lambda_s\tau$$

$$v_s = -h_s e^{-h_s\tau} \frac{v_0}{\lambda_s} \sin\lambda_s\tau + \lambda_s e^{-h_s\tau} \frac{v_0}{\lambda_s} \cos\lambda_s\tau$$

At the beginning of mass $m_1$—fender contact and at its end after time $\tau_i$ oscillator (1) is in the equilibrium state so the contact takes place during the time equal to the half of the oscillation period:

$$\tau_i = \frac{1}{2}T_i = \frac{\pi}{\lambda_s}$$

FIG. 12 presents the equivalent response of mass $m_1$ when impacts with fender at first time. As can be seen from the figure, impact duration $\tau_1$ and impact amplitude $H_{acc}$ are marked for the first impact, and these two vital parameters are used to construct the impact map which can identify the characteristic of the rock.

If the control parameters are kept constant, for different types of rock, the impact duration and the impact amplitude are different. For soft types of rock, the impact duration is longer and the impact amplitude is smaller. For hard types of rock, the impact duration is shorter, and the impact amplitude is larger.

FIG. 13 shows the impact map with various stiffness coefficients using the same control parameters. When the stiffness increases (from bottom right to top left), the impact duration becomes shorter and the impact amplitude becomes larger. So it is straightforward to identify the stiffness of the rock by monitoring the location of the impact in this map.

To understand the impact action more, FIG. 14 shows the impact map with various stiffness coefficients and different impact velocity. It is found that, with the same stiffness coefficient, the impact duration remains unchanged when the impact velocity is different. It can also be concluded that the variation of the stiffness of the rock by applying larger impact velocity (marked by the uppermost circles) is more obvious than the variation by applying smaller impact velocity (marked by the lowermost circles). This phenomenon is interesting as it demonstrates the requirement to operate RED in a resonant condition.

Penetration-based identification

The main difference between impact identification and this method is that, the former considers the geometry of an impact action by using the impact duration and the impact amplitude of an acceleration single, while the later considers the impact amplitude of an acceleration single and the penetration of the drill-bit into the rock.

An impact oscillator with drift as shown in FIG. 15 is considered (adapted from Pavlovskaia E., Wiercigroch M., Grebogi C.: (2001), Modelling of an impact system with a drift, Phy Rev E, 64, 056224) where a mass m is driven by an external force containing a harmonic component of amplitude $P_d$, frequency $\Omega$ and phase shift $\varphi$, and a static component, $P_s$. It is assumed that at the initial moment t=0, a gap G is the distance between the mass and the weightless slider top plate which is connected to a slider bottom plate by a linear spring with stiffness k, and a viscous damper with damping coefficient c. $X_m$, $X_t$, $X_b$ represent the absolute displacement of the mass, slider top, and slider bottom, respectively. It is assumed that gravity force is included in the static force, or the model operates in a horizontal plane.

The considered system is written to the set of first-order differential equations:

$$x' = y,$$

$$y' = a \cos(\omega\tau + \varphi) + b - P_1 P_2(1 - P_3)(2\xi y + z - v) - P_1 P_3,$$

$$z' = P_1 y - (1 - P_1)(z - v)/2\xi,$$

$$v' = P_1 P_3 P_4 [y + (z - v - 1)/2\xi]. \quad (3)$$

where H(.) is the Heaviside function described as $$P_1 = P_1(x, z) = H(x - z - g),$$

$$P_2 = P_2(z, z', v) = H(2\xi z' + z - v),$$

$$P_3 = P_3(z, z', v) = H(2\xi z' + z - v - 1),$$

$$P_4 = P_4(v') = H(v'),$$

Assuming the stiffness of the linear spring k is unknown, the purpose of this method is to estimate the stiffness of the drifting oscillator which mimics the stiffness of the rock during a drilling process.

A time history of displacement of the investigated system is shown in FIG. 16 (a), which solid line represents the displacement of the mass and dash line represents the displacement of the slider bottom. As can be seen, the system is in period-1 response which the mass has one impact with the slider top per period of forcing. In Pavlovskaia E., Wiercigroch M., Grebogi C.: (2001), Modelling of an impact system with a drift, Phy Rev E, 64, 056224, it has been found that the phase portrait using the mass velocity y versus the relative displacement x-v as shown in FIG. 16 (*b*) gives better insight into this impact behaviour. However, from phase portrait, it is difficult to estimate the acceleration of the mass during the impact with slider top. This impact behaviour has been used to mimic the impact between drill-bit and rock. If the stiffness of the rock is identified during impact, appropriate dynamic and static force can be applied in order to achieve optimum penetration rate. The present invention provides a method for stiffness identification by constructing the phase portrait using mass acceleration and relative displacement.

Numerical results in FIG. 17 show a time history of the system with impact only, which FIG. 17 (*a*) presents the displacements of the mass, slider top, and slider bottom, and FIG. 17 (*b*) presents the acceleration of the mass during impact. FIG. 18 shows the trajectory of acceleration of the mass versus relative displacement. Three critical points, A, B, and C are marked in FIGS. 17 and 18 which indicate start of impact, maximum of relative displacement, and end of impact, respectively. As can be seen, from point A, the mass starts to contact and moves downwards together with slider top, and the reactive force from slider top acting on the mass increases immediately. Once the mass stops by the reactive force, the acceleration of the mass achieves maximum along upwards direction and the relative displacement between the mass and the slider bottom is also maximum. If the reactive force is larger, the maximum of acceleration in upwards direction is larger and the maximum of relative displacement is shorter. It is therefore we can conclude that the maximums of acceleration of the mass and the relative displacement are dependent of stiffness coefficient of the linear spring. FIG. 19 demonstrates the conclusion above by simulating the system using three different stiffness coefficients. It is seen that the response with stiffness coefficient, k=0.5 shows the largest relative displacement and the smallest mass acceleration, while the response with stiffness coefficient, k=5 shows the smallest relative displacement and the largest mass acceleration.

NARMAX-based identification

The behavior of piecewise linear oscillators subject to sinusoidal inputs have been extensively studied (see Wiercigroch M., Wojewoda J., Krivtsov A. M.: (2005), Dynamics of ultrasonic percussive drilling of hard rocks, J. Sound and Vibration, 280, 739-757). However, most of the investigations have been focused on characterizing complex dynamical regimes observed when the input amplitude or frequency is changed by means of bifurcation maps (see Ing, J., Pavlovskaia, E., Wiercigroch, M., Soumitro, B. "Experimental study of impact oscillator with one-sided elastic constraint". Phil. Trans. R. Soc. A, 366 (2008), 679-705). Although this information provides a useful insight about the drill response when working on a known environment, it cannot be used to identify a new scenario, which is associated with a physically meaningful stiffness change. The inventor has addressed this issue by using nonlinear systems modeling and analysis.

The methodology consists of building a polynomial NARMAX (Nonlinear AutoRegressive Moving Average with eXogenous inputs) model (see Leontaritis, I. J., Billings, S. A. "Input-output parametric models for nonlinear systems, Part I: deterministic nonlinear systems". International Journal of Control, 41 (1985), 303-328) using input-output data from an impact oscillator system shown in FIG. 20. Then, the response of the identified model is analyzed in the frequency domain by extracting the system NOFRFs (Nonlinear Output Frequency Response Functions) (see Lang, Z. Q., Billings, S. A. "Energy transfer properties of non-linear systems in the frequency domain". International Journal of Control, 78 (2005), 345-362) over a certain frequency range of interest, using a novel general framework based on ALEs (Associated Linear Equations) (see Feijoo, J. A. V., Worden, K. and Stanway, R. "Associated linear equations for Volterra operators". Mechanical Systems and Signal Processing, 19 (2005), 57-69). Simulation studies have been conducted. The results demonstrate that a simple NOFRFs energy based index can significantly distinguish different scenarios of stiffness changes so as to be able to use to monitor the system's operational conditions.

Consider the dimensionless model of the impact oscillator:

$$\frac{d^2x}{d\tau^2} + 2\xi\frac{dx}{d\tau} + x + \beta(x-e)h(x-e) = u$$

Adopted parameters are $$\xi = \frac{c}{4\pi m f_n} \text{ and } e = \frac{g}{x_0},$$

where m=1, g=0.00126, $f_n$=9.38, c=1.3, $x_0$=0.001. Different values of β were used in different simulations. The following values were tested: β=1, 5, 6, 8, 10, and 20.

The system was identified using a sinusoidal input:

$$u = \frac{Af^2}{f_n x_0}\sin\left(\frac{f}{f_n}\tau\right)$$

where A=0.005 and f=8. These values were chosen because they produce distinguishable and simple (no bifurcations) outputs for the studied range of β (smaller frequencies yield outputs which are too similar, larger frequencies produce dynamical regimes which are very difficult to identify).

The system was integrated using 4-th order Runge-Kutta solver with a fixed $\tau_s$=0.06 integration step. Each simulation runs until $\tau_f$=294.62 (5000 points).

NARMAX models with a maximum delay of 2 samples and nonlinearities up to third degree were identified using an ERR-based orthogonal estimator. The thresholds for Moving Average (MA) and non-MA terms were $10^{-8}$. NOFRFs were estimated for the sinc input:

$$u = \frac{Af^2}{f_n x_0}\text{sinc}\left(150\tau_s\left(\tau - \frac{\tau_f}{2}\right)\right)$$

by splitting each NARMAX model into the corresponding Associated Linear Equations (ALEs). The n-th order NOFRF is obtained by dividing DFT of the n-th order ALE output by the DFT of $u^n$. These estimates are reliable for 1≤k≤1000, which is the frequency range of the sinc input.

The measurement that allows distinguishing between different cases is the energy of the n-th order NOFRF:

$$M_n = \frac{1}{1000}\sum_{k=1}^{1000}|G_n(k)|^2$$

where $G_n(k)$ is the n-th order NOFRF at frequency component k.

The identification result is presented in Table 3 which shows how the index changes for different stiffness values.

TABLE 3

Identification result for various stiffness values

| β | $M_1$ | $M_2$ | $M_3$ |
|---|---|---|---|
| 1 | 2.9092 | 0.0359 | 0.0002 |
| 5 | 1.0680 | 0.4267 | 49.4126 |
| 6 | 2.7188 | 2.0404 | 49.9415 |
| 8 | 2.1352 | 3.2787 | 244.7598 |
| 10 | 0.6224 | 0.2011 | 26.6961 |
| 20 | 8.8768 | 28.6581 | 266.0859 |

Drilling Module

The previously described embodiments of the present invention are applicable to any size of drill or material to be drilled. Certain more specific embodiments are directed at drilling through rock formations, particularly those of variable composition, which may be encountered in deep-hole drilling applications in the oil, gas and mining industries. The present invention helps to determine the numerical values of the various parameters that are suitable for drilling through such rock formations.

In constructing a drilling module for use with the present invention, the conditions involved in the type of drilling envisaged are taken into account. For example, a drilling module for use in drilling for oil is likely to differ significantly from a drilling module for use in the construction industry. When drilling in rock formations, the compressive strength of rock formations has a large variation, from around $U_s$=70 MPa for sandstone up to $U_s$=230 MPa for granite. In large scale drilling applications such as in the oil industry, drill-bit diameters range from 90 to 800 mm (3½ to 32"). If only approximately 5% of the drill-bit surface is in contact with the rock formation then the lowest value for required dynamic force is calculated to be approximately 20 kN (using a 90 mm drill-bit through sandstone). Similarly, the largest value for required dynamic force is calculated to be approximately 6000 kN (using an 800 mm drill-bit through granite). As such, for drilling through rock formations the dynamic force is preferably controlled to be maintained within the range 20 to 6000 kN depending on the diameter of the drill-bit. As a large amount of power will be consumed to drive an oscillator with a dynamic force of 6000 kN it may be advantageous to utilize the invention with a mid-to-small diameter drill-bit for many applications. For example, drill-bit diameters of 90 to 400 mm result in an operational range of 20 to 1500 kN. Further narrowing the drill-bit diameter range gives preferred ranges for the dynamic force of 20 to 1000 kN, more preferably 40 to 500 kN, more preferably still 50 to 300 kN.

A lower estimate for the necessary displacement amplitude of vibration is to have a markedly larger vibration than displacements from random small scale tip bounces due to inhomogeneities in the rock formation. As such the amplitude of vibration is advantageously at least 1 mm. Accordingly, the amplitude of vibration of the oscillator may be maintained within the range 1 to 10 mm, more preferably 1 to 5 mm.

For large scale drilling equipment the vibrating mass of the module may be of the order of 10 to 1000 kg. The feasible frequency range for such large scale drilling equipment does not stretch higher than a few hundred Hertz. As such, by selecting suitable values for the drill-bit diameter, vibrating mass and amplitude of vibration within the previously described limits, the frequency (f) of the oscillator can be controlled to be maintained in the range 100 to 500 Hz while providing sufficient dynamic force to create a crack propagation zone for a range of different rock types and being sufficiently high frequency to achieve a resonance effect.

Figure 1:
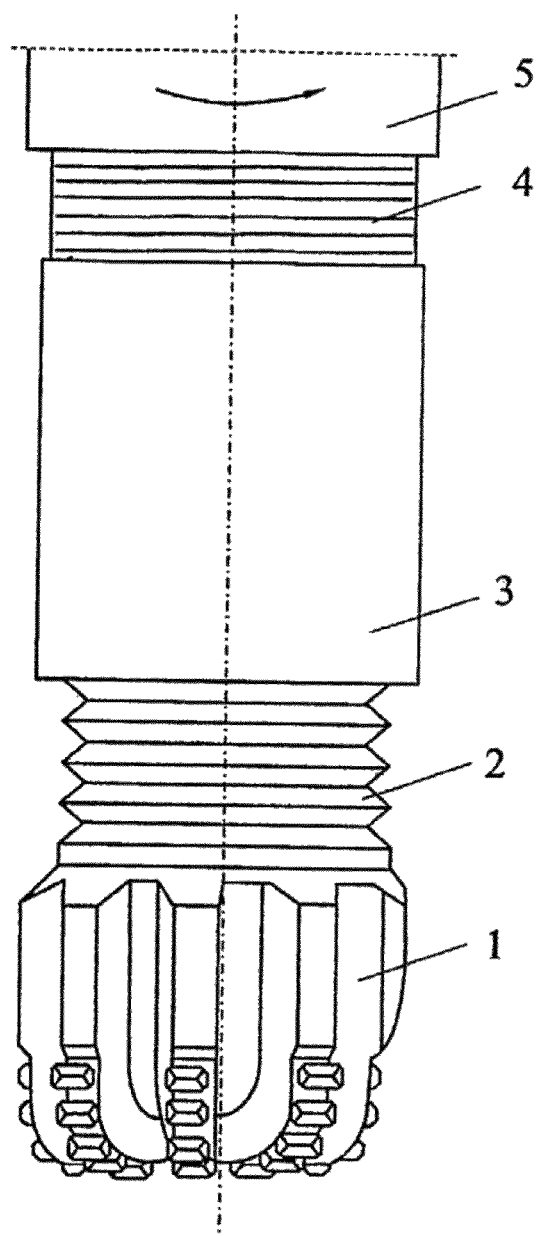
Figure 2:
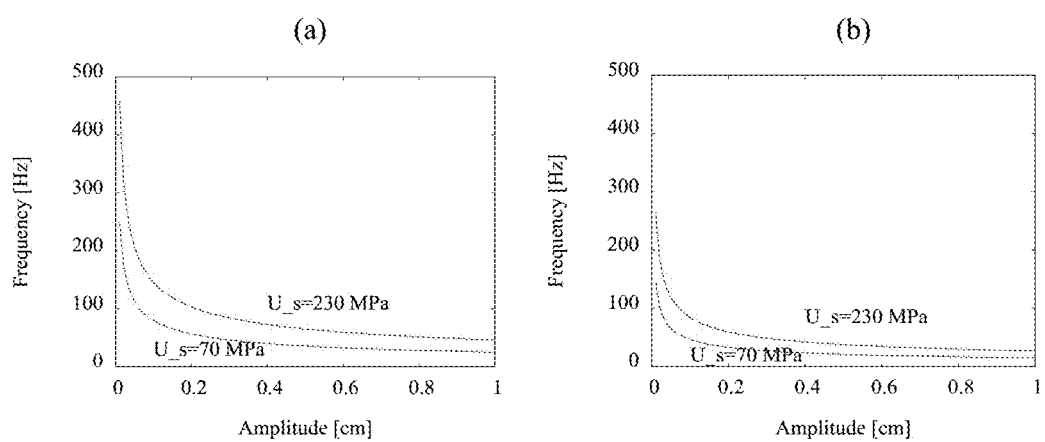

FIGS. 2(a) and (b) show graphs illustrating frequency as a function of vibration amplitude for a drill-bit having a diameter of 150mm. Graph (a) is for a vibrational mass m=10 kg whereas graph (b) is for a vibrational mass m=30 kg. The lower curves are valid for weaker rock formations while the upper curves are for rock with high compressive strength. As can be seen from the graphs, an operational frequency of 100 to 500 Hz in the area above the curves will provide a sufficiently high frequency to generate a crack propagation zone in all rock types using a vibrational amplitude in the range 1 to 10 mm (0.1 to 1 cm).

Figure 3:
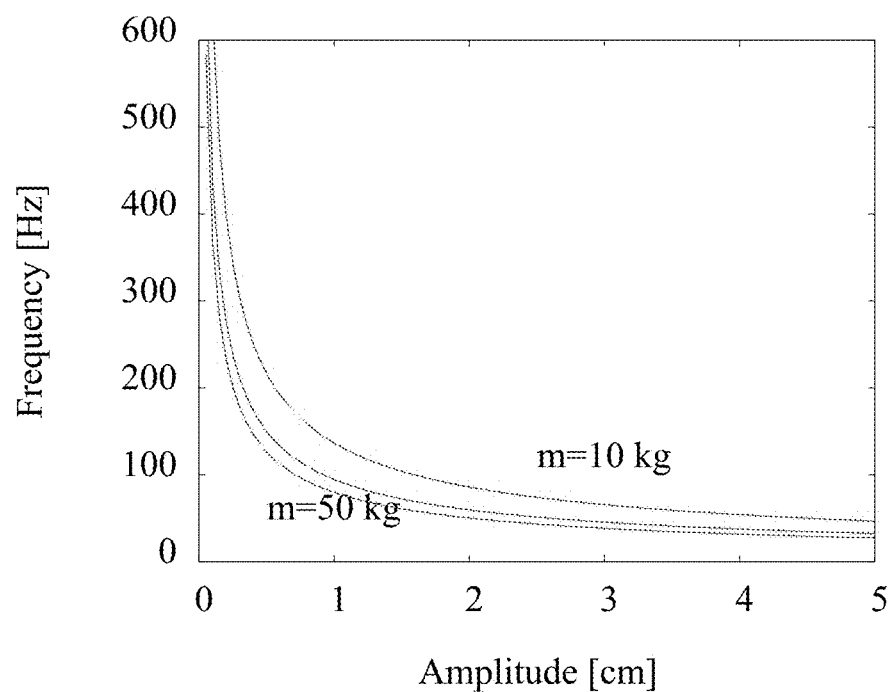

FIG. 3 shows a graph illustrating frequency as a function of vibration amplitude for various vibrational masses given a fixed power supply. The graph is calculated for a power supply of 30 kW which can be generated down hole by a mud motor or turbine used to drive the rotary motion of the drill bit. The upper curve is for a vibrating mass of 10 kg whereas the lower curve is for a vibrating mass of 50 kg. As can be seen from the graph, the frequency range of 100 to 500 Hz is accessible for a vibrational amplitude in the range 1 to 10 mm (0.1 to 1 cm).

It may be feasible to provide a computer on the surface which processes signals from sensors down the borehole and then sends control signals back down the borehole for controlling the drill head. However, this will be difficult to achieve in practice for deep bore hole drilling as signalling between the surface and the bottom of the bore hole is not straight forward and may also be quite slow. Alternatively, it may be possible to locate the sensing, processing and control elements of the feedback mechanism down the bore hole but outside of the drill head assembly. However, in practice there may be little space down the bore hole and also the mechanism may be subjected to hash physical conditions.

Accordingly, the best arrangement for providing feedback control is to locate all the sensing, processing and control elements of the feedback mechanism within a down hole assembly, e.g. within the drilling module. This arrangement is the most compact, provides faster feedback and a speedier response to changes in resonance conditions, and also allows drilling modules to be manufactured with the necessary feedback control integrated therein such that the modules can be retro fitted to existing drill strings without requiring the whole of the drilling system to be replaced.

For large scale drilling equipment, the oscillator advantageously comprises a piezoelectric actuator with mechanic amplification, a magnetostrictive actuator, a pneumatic actuator, or an electrically driven mechanical actuator. It has been found that these actuators can achieved the desired frequency, dynamic force, vibrational amplitude and power consumption ranges for use with the previously described method.

Uses of embodiments of the present invention include: well drilling, e.g. oil well drilling; mining, e.g. coal, diamond, etc . . . ; surface drilling, e.g. road works and the like; and hand-held drills, e.g. DIY drills for home use, dentists drills, etc.

Advantages of embodiments of the present invention include: increased drilling speed; better borehole stability and quality; less stress on apparatus leading to longer lifetimes; and greater efficiency reducing energy costs.

The invention claimed is:

1. A method for controlling a resonance enhanced rotary drill comprising a drilling module and a control system for controlling one or more drilling parameters of the drilling module, which method comprises:
   (a) employing one or more initial characteristics of a material being drilled, and/or one or more initial drilling parameters to the control system and/or to the drilling module;
   (b) measuring one or more current drilling parameters to obtain one or more measured drilling parameters;
   (c) employing the one or more measured drilling parameters as an input in the control system, in order to obtain an output from the control system, which output comprises one or more calculated characteristics of the material being drilled, wherein the one or more calculated characteristics of the material being drilled are obtained using one or more models selected from an empirical model and a mathematical model, and wherein the one or more calculated characteristics of the material being drilled comprises the stiffness or the effective stiffness of the material;
   (d) employing
     the one or more calculated characteristics of the material being drilled and the one or more measured drilling parameters
     as inputs in the control system, in order to obtain an output from the control system, which output comprises one or more calculated drilling parameters, wherein the one or more calculated drilling parameters are obtained using a fuzzy logic model;
   (e) applying the one or more calculated drilling parameters to the drilling module;
   (f) optionally repeating steps (b), (c) (d) and (e).

2. A method according to claim 1, wherein in step (d) one or more calculated drilling parameters from a previous iteration of the control process are employed as further input to determine the calculated drilling parameters.

3. A method according to claim 1, wherein the initial, current or measured drilling parameters comprise one or more of the following:
   (a) axial drill force on the material being drilled (also called "weight on bit" (WOB), or "static force")
   (b) velocity or speed of the drill-bit and/or drilling module through the material being drilled;
   (c) the acceleration of the drill-bit and/or drilling module through the material being drilled;
   (d) the frequency of oscillation of the drill-bit and/or drilling module;
   (e) the amplitude of oscillation of the drill-bit and/or drilling module;
   (f) the oscillatory axial force on the material being drilled (also called the "dynamic force");
   (g) the rotary velocity or rotary speed of the drill;
   (h) the rotary force or torque of the drill on the material being drilled;
   (i) fluid flow rate; and
   (j) relative displacement of the drill-bit.

4. A method according to claim 1, wherein the characteristics of the material being drilled comprise one or more of:
   (a) the compressive strength of the material
   (b) the stiffness or the effective stiffness of the material;
   (c) the yield strength of the material;
   (d) the impact strength of the material;
   (e) the fatigue strength of the material;
   (f) the tensile strength of the material;
   (g) the shear strength of the material;
   (h) the hardness of the material;
   (i) the density of the material;
   (j) the Young's modulus of the material; and
   (k) the Poisson's ratio of the material.

5. A method according to claim 1, wherein the one or more initial characteristics of the material being drilled in step (a) are obtained from empirical information, preferably from a database.

6. A method according to claim 1, wherein the one or more initial drilling parameters in step (a) are obtained from empirical information, preferably from a database.

7. A method according to claim 1, wherein the one or more models comprise a neural network.

8. A method according to claim 1, wherein the one or more models comprise a NARMAX model and/or an impact based model and/or a penetration based model.

9. A method according to claim 1 wherein the fuzzy logic model comprises:
   (i) processing the step (d) input parameters to produce fuzzy input parameters;
   (ii) processing the fuzzy input parameters to produce fuzzy conclusions; and
   (iii) processing the fuzzy conclusions to give the step (d) output parameters.

10. A method according to claim 9, wherein step (i) comprises employing a membership function to convert the one or more input parameters to one or more fuzzy input parameters.

11. A method according to claim 9, wherein step (ii) comprises an inference mechanism and a rule base, wherein the inference mechanism is employed to select from the rule base one or more rules to apply based upon the input parameters and/or the fuzzy input parameters of step (i), and wherein the one or more rules are applied to one or more fuzzy input parameters to convert them to one or more fuzzy conclusions.

12. A method according to claim 9, wherein step (iii) comprises employing a membership function and/or a centre of gravity method to convert the one or more fuzzy conclusions to the step (d) output parameters.

13. A method according to claim 1, wherein step (e) of applying the one or more calculated drilling parameters to the drilling module is carried out if one or more of the calculated drilling parameters are different from the equivalent one or more of the measured drilling parameters.

14. A method according to claim 1, wherein the step (b) of measuring one or more current drilling parameters to obtain one or more measured drilling parameters is carried out using one or more sensors incorporated in the drilling module.

15. A method according to claim 14, wherein the one or more sensors are selected from a load cell, an eddy current sensor, an accelerometer, a sensor for measuring current or current changes, and a sensor for measuring voltage or voltage changes.

16. A method according to claim 1, wherein the method comprises using further parameters in one or more steps of the control method.

17. A method according to claim 16, wherein the further parameters are selected from:

(a) the diameter of the drill bit;
(b) the mass of the drilling module;
(c) the temperature of the material being drilled;
(d) the geostatic pressure or pore pressure of the material being drilled;
(e) the length of the drilling module
(f) the width of the bore hole; and
(g) the depth of the bore hole.

18. A method of drilling, which method comprises operating a resonance enhanced drill to drill a material, wherein the resonance enhanced drill is controlled according to a method of claim 1.

19. A control system for resonance enhanced drilling, which control system comprises:
   (a) a controller for determining one or more characteristics of a material to be drilled, and
   (b) a controller for determining one or more drilling parameters;
wherein the control system is capable of performing a method of claim 1.

20. An apparatus for resonance enhanced drilling, which apparatus comprises:
   (a) a drilling module; and
   (b) a control system as defined in claim 19.

* * * * *